United States Patent
Iizuka et al.

(10) Patent No.: US 11,255,955 B2
(45) Date of Patent: Feb. 22, 2022

(54) ESTIMATION METHOD, ESTIMATION DEVICE, AND RECORDING MEDIUM

(71) Applicant: PANASONIC INTELLECTUAL PROPERTY MANAGEMENT CO., LTD., Osaka (JP)

(72) Inventors: Shoichi Iizuka, Osaka (JP); Takeshi Nakayama, Hyogo (JP); Naoki Honma, Iwate (JP); Nobuyuki Shiraki, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 16/707,230

(22) Filed: Dec. 9, 2019

(65) Prior Publication Data

US 2020/0209379 A1 Jul. 2, 2020

(30) Foreign Application Priority Data

Dec. 28, 2018 (JP) .............................. JP2018-246741
Sep. 2, 2019 (JP) .............................. JP2019-159684

(51) Int. Cl.
*G01S 13/42* (2006.01)
*G01S 13/12* (2006.01)
*G01S 13/04* (2006.01)

(52) U.S. Cl.
CPC ............... *G01S 13/12* (2013.01); *G01S 13/04* (2013.01)

(58) Field of Classification Search
CPC ........ G01S 13/003; G01S 13/42; G01S 13/46; G01S 13/88; G01S 7/354; G01S 7/415; G01S 13/04
See application file for complete search history.

(56) References Cited

U.S. PATENT DOCUMENTS 7,372,404 B2 * 5/2008 Shirai ...................... G01S 3/74
342/417
10,241,187 B2 3/2019 Honma et al.
(Continued)

FOREIGN PATENT DOCUMENTS

JP 2000-171550 A 6/2000
JP 2009-281775 A 12/2009
(Continued)

*Primary Examiner* — Kyle R Quigley
(74) *Attorney, Agent, or Firm* — Greenblum & Bernstein, P.L.C.

(57) ABSTRACT

An estimation method according to the present disclosure includes: extracting, from a plurality of calculated complex transfer functions, living body components respectively corresponding to N reception antenna elements and affected by a living body; calculating a correlation matrix based on the extracted living body components respectively corresponding to the N reception antenna elements; computing one or more eigenvalues of the calculated correlation matrix; estimating a credibility of an estimation result of estimating the position or the direction of a living body in a target space, using the one or more computed eigenvalues and living body count information indicating a value indicating a total number of living bodies in the target space; and estimating the position or the direction of the living body via a predetermined method, based on the correlation matrix, according to the credibility of the estimation result.

15 Claims, 13 Drawing Sheets

(56) References Cited

U.S. PATENT DOCUMENTS

| | | | |
|---|---|---|---|
| 2017/0184699 A1* | 6/2017 | Honma | G01S 13/003 |
| 2017/0205502 A1* | 7/2017 | Honma | G01S 13/42 |
| 2018/0196131 A1* | 7/2018 | Iizuka | G01S 7/414 |
| 2019/0195997 A1 | 6/2019 | Iizuka et al. | |

FOREIGN PATENT DOCUMENTS

| | | |
|---|---|---|
| JP | 2015-117972 A | 6/2015 |
| JP | 2019-117055 A | 7/2019 |

* cited by examiner

FIG. 3

| FIRST EIGENVALUE | SECOND EIGENVALUE | THIRD EIGENVALUE | FOURTH EIGENVALUE |
|---|---|---|---|
| 20 | 18 | 0.15 | 0.12 |
| 20 | 16 | 15 | 0.13 |
| 20 | 0.3 | 0.21 | 0.2 |

FIG. 4

| FIRST EIGENVALUE / SECOND EIGENVALUE | SECOND EIGENVALUE / THIRD EIGENVALUE | THIRD EIGENVALUE / FOURTH EIGENVALUE | CREDIBILITY |
|---|---|---|---|
| 1.11 | 120 | 1.25 | HIGH |
| 1.25 | 1.07 | 115.38 | LOW |
| 66.67 | 1.43 | 1.05 | LOW | ers
ESTIMATION METHOD, ESTIMATION DEVICE, AND RECORDING MEDIUM

CROSS REFERENCE TO RELATED APPLICATION

This application claims the benefit of priority of Japanese Patent Application Number 2018-246741 filed on Dec. 28, 2018, and Japanese Patent Application Number 2019-159684 filed on Sep. 2, 2019, the entire content of each is hereby incorporated by reference.

BACKGROUND

1. Technical Field

The present disclosure relates to an estimation method, an estimation device, and a recording medium that use radio signals.

2. Description of the Related Art

There is a technique that detects a target using radio signals (for example, Japanese Unexamined Patent Application Publication No. 2009-281775 and Japanese Unexamined Patent Application Publication No. 2000-171550). For example, Japanese Unexamined Patent Application Publication No. 2009-281775 discloses a technique that calculates an autocorrelation matrix of reception signals, and calculates the number of targets based on the magnitude of eigenvalues of the autocorrelation matrix. For example, Japanese Unexamined Patent Application Publication No. 2000-171550 discloses a technique that obtains the number of targets by eigenvalue decomposition of a correlation matrix of reception signals and counting the number of eigenvalues greater than or equal to a threshold.

For example, Japanese Unexamined Patent Application Publication No. 2015-117972 discloses a technique that measures the position or state of a person, which is the detection target, by analyzing components including a Doppler shift using the Fourier transform.

SUMMARY

However, there is a problem with techniques disclosed in Japanese Unexamined Patent Application Publication No. 2009-281775 and Japanese Unexamined Patent Application Publication No. 2000-171550 in that they are techniques for detecting the position of a device, not techniques for estimating the position of a living body. Moreover, with the technique disclosed in Japanese Unexamined Patent Application Publication No. 2015-117972, there are instances in which instantaneous measurement errors occur due to, for example, external noise, and there is no way of knowing how credible the measurement result is, which is problematic.

The present disclosure is conceived in view of the aforementioned circumstances and has an object to provide an estimation method, an estimation device, and a recoding medium capable evaluating the credibility of an estimation result of a position, etc., of a living body in the target space using radio signals.

In order to achieve the object described above, an estimation method, etc., according to one aspect of the present disclosure is an estimation method of an estimation device of estimating a position or a direction of a living body in a target space, the estimation method using (i) a transmitter including at least one transmission antenna element and (ii) a receiver including N reception antenna elements, where N is a natural number greater than or equal to two, and includes: calculating, based on reception signals respectively received by the N reception antenna elements over a predetermined period of time, a plurality of complex transfer functions representing propagation characteristics between the at least one transmission antenna element and each of the N reception antenna elements; extracting, from the plurality of complex transfer functions calculated in the calculating of the plurality of complex transfer functions, living body components respectively corresponding to the N reception antenna elements and affected by the living body; calculating a correlation matrix based on the living body components respectively corresponding to the N reception antenna elements extracted in the extracting; computing one or more eigenvalues of the correlation matrix calculated in the calculating of the correlation matrix; estimating a credibility of an estimation result of estimating the position or the direction of the living body, using living body count information and the one or more eigenvalues computed in the computing, the living body count information indicating a value indicating a total number of living bodies in the target space; and estimating the position or the direction of the living body via a predetermined method, based on the correlation matrix, according to the credibility of the estimation result.

General and specific aspect(s) disclosed above may be implemented using a device, a method, an integrated circuit, a computer program, or a computer-readable recording medium such as a CD-ROM, or any combination thereof.

With the estimation method, etc., according to the present disclosure, it is possible to evaluate the credibility of an estimation result of a position, etc., of a living body in the target space using radio signals.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 illustrates one example of an eigenvalue distribution according to Embodiment 1;

FIG. 4 illustrates one example of ratio information calculated based on the eigenvalue distribution according to Embodiment 1;

DETAILED DESCRIPTION OF THE EMBODIMENTS

Figure 1:
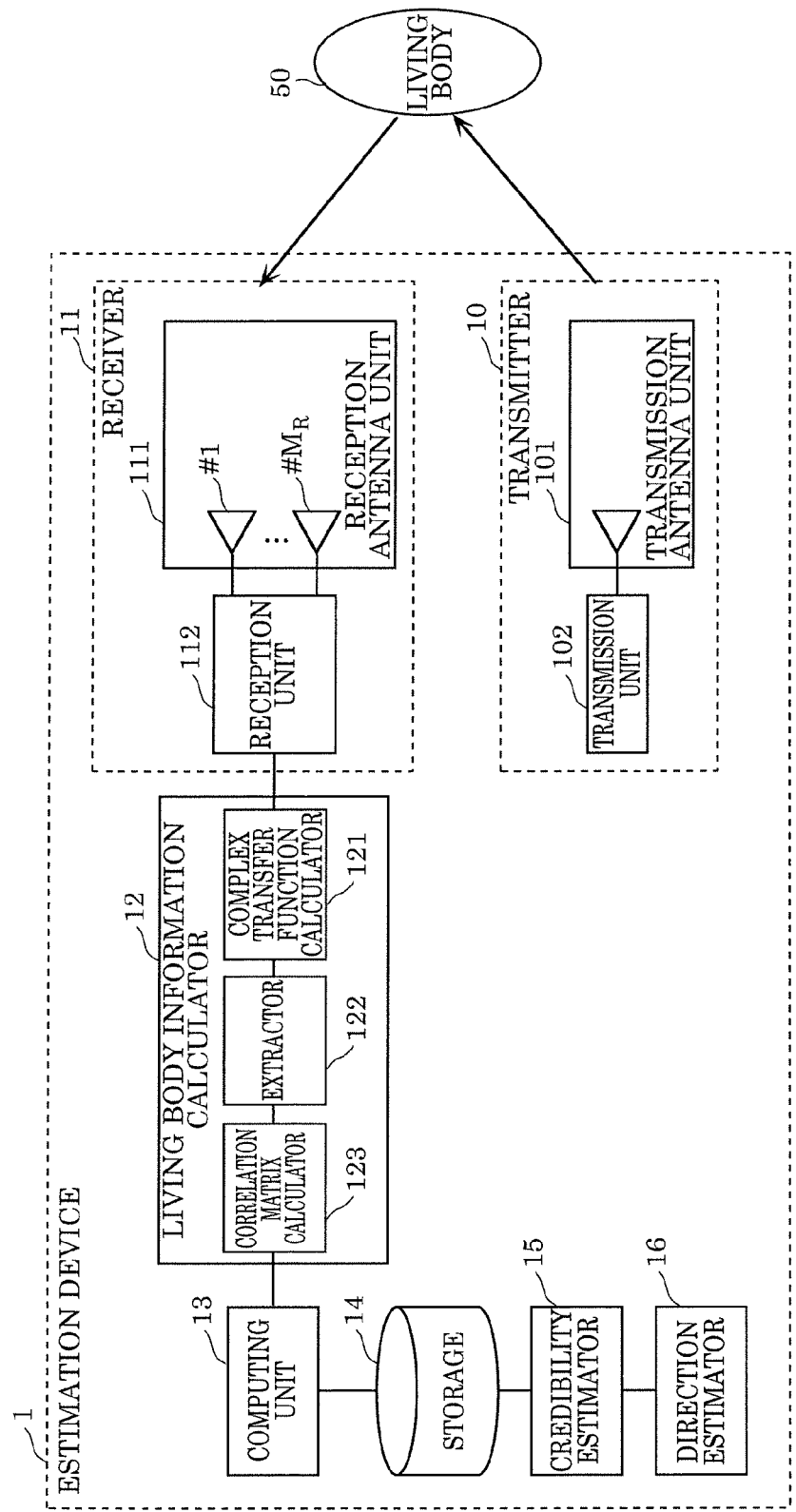
FIG. 1 is a block diagram illustrating one example of a configuration of an estimation device according to Embodiment 1.

Underlying Knowledge Forming Basis of the Present Disclosure

The inventors closely examined background art related to the estimation of a position, etc., of a living body that uses radio signals. As a result, the inventors discovered that the techniques disclosed in Japanese Unexamined Patent Application Publication No. 2009-281775 and Japanese Unexamined Patent Application Publication No. 2000-171550 are problematic as they are techniques for detecting the position of a device, not techniques for estimating the position of a living body. Moreover, with the technique disclosed in Japanese Unexamined Patent Application Publication No. 2015-117972, there are instances in which instantaneous measurement errors occur due to, for example, external noise, and there is no way of knowing how credible the measurement result is, which is problematic.

After much diligent research on the part of the Inventors, they arrived at the present disclosure by discovering that it is possible to evaluate the credibility of an estimation result of a position, etc., of a living body in the target space using radio signals received by a receiver. Stated differently, the inventors discovered that it is possible to evaluate the credibility of a measurement result by calculating complex transfer functions based on radio signals received by a receiver and using an evaluation function computed using a correlation matrix obtained from the calculated complex transfer functions, or using one or more eigenvalues of the correlation matrix.

More specifically, in order to achieve the object described above, an estimation method according to one aspect of the present disclosure is an estimation method of an estimation device of estimating a position or a direction of a living body in a target space, the estimation method using (i) a transmitter including at least one transmission antenna element and (ii) a receiver including N reception antenna elements, where N is a natural number greater than or equal to two, includes: calculating, based on reception signals respectively received by the N reception antenna elements over a predetermined period of time, a plurality of complex transfer functions representing propagation characteristics between the at least one transmission antenna element and each of the N reception antenna elements; extracting, from the plurality of complex transfer functions calculated in the calculating of the plurality of complex transfer functions, living body components respectively corresponding to the N reception antenna elements and affected by the living body; calculating a correlation matrix based on the living body components respectively corresponding to the N reception antenna elements extracted in the extracting; computing one or more eigenvalues of the correlation matrix calculated in the calculating of the correlation matrix; estimating a credibility of an estimation result of estimating the position or the direction of the living body, using living body count information and the one or more eigenvalues computed in the computing, the living body count information indicating a value indicating a total number of living bodies in the target space; and estimating the position or the direction of the living body via a predetermined method, based on the correlation matrix, according to the credibility of the estimation result.

This makes it possible to, in addition to estimating the position, etc., of living body 50 in the target space using radio signals, evaluate the credibility of the estimation result of the position, etc., of the living body in the target space using radio signals.

Here, for example, in the estimating of the credibility, (1) ratio information indicating a ratio of or difference between adjacent eigenvalues when the one or more eigenvalues computed in the computing are sorted in descending order of magnitude is calculated; and (2) when the value indicated by the living body count information is L, if the ratio information corresponding to an L-th eigenvalue of the one or more eigenvalues sorted is at least a predetermined value, the credibility of the estimation result is determined to be high, where L is a natural number greater than or equal to one.

This makes it possible to evaluate the credibility of the estimation result by using one or more eigenvalues of a correlation matrix.

Moreover, in order to achieve the object described above, an estimation method, according to one aspect of the present disclosure is an estimation method of an estimation device of estimating a direction or a position of a living body in a target space, the estimation method using (i) a transmitter including at least one transmission antenna element and (ii) a receiver including N reception antenna elements, where N is a natural number greater than or equal to two, and includes: calculating, based on reception signals respectively received by the N reception antenna elements over a predetermined period of time, a plurality of complex transfer functions representing propagation characteristics between the at least one transmission antenna element and each of the N reception antenna elements; extracting, from the plurality of complex transfer functions calculated in the calculating of the plurality of complex transfer functions, living body components respectively corresponding to the N reception antenna elements and affected by the living body; calculating a correlation matrix based on the living body components respectively corresponding to the N reception antenna elements extracted in the extracting; estimating the direction or the position of the living body, by computing an evaluation function using the correlation matrix, and using the evaluation function computed; and estimating a credibility of an estimation result of the estimating of the direction or the position of the living body, using the evaluation function computed in the estimating of the direction or the position of the living body.

This makes it possible to evaluate the credibility of the estimation result by using an evaluation function computed using a correlation matrix.

Here, for example, the evaluation function computed in the estimating of the direction or the position of the living body is a MUltiple Signal Classification (MUSIC) spectrum.

Moreover, for example, the evaluation function computed in the estimating of the direction or the position of the living body is a spectrum obtained via a Capon method.

Moreover, for example, the evaluation function computed in the estimating of the direction or the position of the living body is a spectrum obtained via a beamforming method.

Moreover, for example, in the estimating of the credibility, when the credibility estimated is less than a threshold, the credibility may be determined to be low, and when the credibility estimated is greater than or equal to the threshold, the credibility may be determined to be high.

Moreover, for example, in the estimating of the position or the direction of the living body, when the credibility is determined to be low in the estimating of the credibility, an estimation result of the estimating of the position or the direction of the living body whose credibility is determined to be high in the estimating of the credibility may be output from among estimation results generated in a period of time before the credibility is determined to be low.

This makes it possible to use a highly credible estimation result.

Moreover, for example, in the estimating of the position or the direction of the living body, when the credibility is determined to be low in the estimating of the credibility, an estimation result of the estimating of the position or the direction of the living body whose credibility is determined to be high in the estimating of the credibility may be output from among estimation results corresponding to a frequency range excluding a frequency corresponding to the credibility determined to be low.

This makes it possible to use a highly credible estimation result.

Moreover, for example, in the estimating of the position or the direction of the living body, when the credibility is determined to be low in the estimating of the credibility, an estimation result of the estimating of the position or the direction of the living body whose credibility is determined to be high in the estimating of the credibility may be output from among estimation results generated in a past predetermined period of time and corresponding to a predetermined frequency range.

This makes it possible to use a highly credible estimation result.

Moreover, for example, in the estimating of the position or the direction of the living body, when the credibility is determined to be low in the estimating of the credibility and a current estimation result of the estimating of the position or the direction of the living body is removed from an immediately previous estimation result by an amount of time or a span of frequencies that is greater than or equal to a threshold, an estimation result whose credibility is determined to be high may be output from among estimation results generated in a period of time before the credibility is determined to be low.

This makes it possible to use a highly credible estimation result.

Moreover, for example, the estimation method may further include storing, in a storage, estimation results of past estimations performed in the estimating of the position or the direction of the living body. In the estimating of the position or the direction of the living body, when the credibility is determined to be low in the estimating of the credibility, an average or a median of the estimation results of the past estimations that are stored in the storage and from a time range defined by a first interval set longer than a reference interval in accordance with a degree of the credibility may be calculated and output as a current estimation result.

This makes it possible to use a highly credible estimation result.

Moreover, for example, the estimation method may further include storing, in a storage, estimation results of past estimations performed in the estimating of the position or the direction of the living body. In the estimating of the position or the direction of the living body, when the credibility is determined to be low in the estimating of the credibility, an average or a median of the estimation results of the past estimations that are stored in the storage and from a frequency range defined by a second interval set longer than a reference interval in accordance with a degree of the credibility may be calculated and output as a current estimation result.

This makes it possible to use a highly credible estimation result.

Moreover, an estimation device according to one aspect of the present disclosure estimates a position or a direction of a living body in a target space using (i) a transmitter including at least one transmission antenna element and (ii) a receiver including N reception antenna elements, where N is a natural number greater than or equal to two, and includes: a complex transfer function calculator that calculates, based on reception signals respectively received by the N reception antenna elements over a predetermined period of time, a plurality of complex transfer functions representing propagation characteristics between the at least one transmission antenna element and each of the N reception antenna elements; an extractor that extracts, from the plurality of complex transfer functions calculated in the complex transfer function calculator, living body components respectively corresponding to the N reception antenna elements and affected by the living body; a correlation matrix calculator that calculates a correlation matrix based on the living body components respectively corresponding to the N reception antenna elements extracted in the extractor; a computing unit configured to compute one or more eigenvalues of the correlation matrix calculated in the correlation matrix calculator; a credibility estimator that estimates a credibility of an estimation result of estimating the position or the direction of the living body, using living body count information and the one or more eigenvalues computed in the computing unit, the living body count information indicating a value indicating a total number of living bodies in the target space; and an estimator that estimates the position or the direction of the living body via a predetermined method, based on the correlation matrix, according to the credibility of the estimation result.

Moreover, a non-transitory computer-readable recording medium according to one aspect of the present disclosure is for use in a computer, the recording medium having a computer program recorded thereon for causing the computer to execute an estimation method of an estimation device of estimating a position or a direction of a living body in a target space, the estimation method using (i) a transmitter including at least one transmission antenna element and (ii) a receiver including N reception antenna elements, where N is a natural number greater than or equal to two. The estimation method includes: calculating, based on reception signals respectively received by the N reception antenna elements over a predetermined period of time, a plurality of complex transfer functions representing propagation characteristics between the at least one transmission antenna element and each of the N reception antenna elements; extracting, from the plurality of complex transfer functions calculated in the calculating of the plurality of complex transfer functions, living body components respectively corresponding to the N reception antenna elements and affected by the living body; calculating a correlation matrix based on the living body components respectively corresponding to the N reception antenna elements extracted in the extracting; computing one or more eigenvalues of the correlation matrix calculated in the calculating of the correlation matrix; estimating a credibility of an estimation result of estimating the position or the direction of the living body, using living body count information and the one or more eigenvalues computed in the computing, the living body count information indicating a value indicating a total number of living bodies in the target space; and estimating the position or the direction of the living body via a predetermined method, based on the correlation matrix, according to the credibility of the estimation result.

Note that in addition to being realized as a device, the present disclosure can be realized as an integrated circuit including the processing units included in such a device, as a method in which the processing units included in such a device are implemented as steps, as a program that causes a computer to execute the steps, and as information, data, or a signal representing such a program. The program, information, data, and signal may be distributed via a recoding medium such as a CD-ROM or via a communication medium such as the internet.

Hereinafter, exemplary embodiments of the present disclosure will be described in greater detail with reference to the Drawings. It should be noted that each of the exemplary embodiments described hereinafter illustrates a specific example of the present disclosure. The numerical values, shapes, materials, elements, the arrangement and connection of the elements, steps, the processing order of the steps, etc., shown in the following exemplary embodiments are mere examples, and are therefore not intended to limit the present disclosure. Furthermore, among the elements in the following exemplary embodiments, those not recited in any one of the independent claims defining the most generic concept of the present disclosure are described as optional elements making up a more preferable form. It should be noted that in the Specification and the Drawings, elements having substantially the same functional configuration are given the same reference sign in order to omit overlapping descriptions.

Embodiment 1

The following will describe, with reference to the drawings, estimation of the direction of a living body in a target space via a predetermined method, by observing a correlation matrix of reception signals using a single input multiple output (SIMO) transmitter and a SIMO receiver, and using eigenvalues of the correlation matrix.

[Configuration of Estimation Device 1]

FIG. 1 is a block diagram illustrating one example of a configuration of estimation device 1 according to Embodiment 1. FIG. 1 also illustrates living body 50, which is the detection target of estimation device 1 illustrated in FIG. 1.

Estimation device 1 according to Embodiment 1 estimates the direction of one or more living bodies 50 in a target space, using transmitter 10 including a single transmission antenna element and receiver 11 including N (N is a natural number greater than or equal to 2) reception antenna elements.

As illustrated in FIG. 1, estimation device 1 according to Embodiment 1 includes transmitter 10, receiver 11, living body information calculator 12, computing unit 13, storage 14, credibility estimator 15, and direction estimator 16.

[Transmitter 10]

Transmitter 10 includes transmission antenna unit 101 and transmission unit 102.

Transmission antenna unit 101 includes a single transmission antenna element.

Transmission unit 102 generates a high-frequency signal. Transmission unit 102 transmits a transmission signal from the single transmission antenna element included in transmission antenna unit 101. The transmission signal is the generated high-frequency signal. Although transmission unit 102 is described as transmitting, for example, a sine wave of 2.45 GHz in the present embodiment, the present disclosure is not limited to this example. Transmission unit 102 may transmit a transmission signal of another frequency, and may transmit a transmission signal generated using some other modulation method.

[Receiver 11]

Receiver 11 includes reception antenna unit 111 and reception unit 112.

Reception antenna unit 111 includes N reception antenna elements. In this embodiment, reception antenna unit 111 is described as including $M_R$ ($M_R$ is an integer greater than or equal to 2) antenna elements, labeled #1 through #$M_R$, as illustrated in FIG. 1, for example. In reception antenna unit 111, each of the $M_R$ reception antenna elements receives a reception signal including a signal transmitted from the single transmission antenna element and, when living body 50 is present, a signal that has reflected off living body 50.

Reception unit 112 observes (i.e., receives) reception signals over a predetermined period of time using each of the N reception antenna elements. More specifically, as illustrated in FIG. 1, reception unit 112 converts high-frequency signals received over a predetermined period of time by each of the $M_R$ reception antenna elements into low-frequency signals that can be processed. Reception unit 112 transmits the converted low-frequency signals to living body information calculator 12.

[Living Body Information Calculator 12]

As illustrated in FIG. 1, living body information calculator 12 includes complex transfer function calculator 121, extractor 122, and correlation matrix calculator 123, and calculates living body information from signals transmitted from receiver 11.

<Complex Transfer Function Calculator 121>

Complex transfer function calculator 121 calculates, based on the reception signals received by the respective N reception antenna elements over the predetermined period of time, a plurality of complex transfer functions representing propagation characteristics between the transmission antenna element and each of the N reception antenna elements. More specifically, complex transfer function calculator 121 calculates complex transfer functions representing propagation characteristics between the single transmission antenna element and each of the $M_R$ reception antenna elements, based on the low-frequency signals transmitted from receiver 11. Hereinafter, this will be described in greater detail with reference to FIG. 2.

Figure 2:
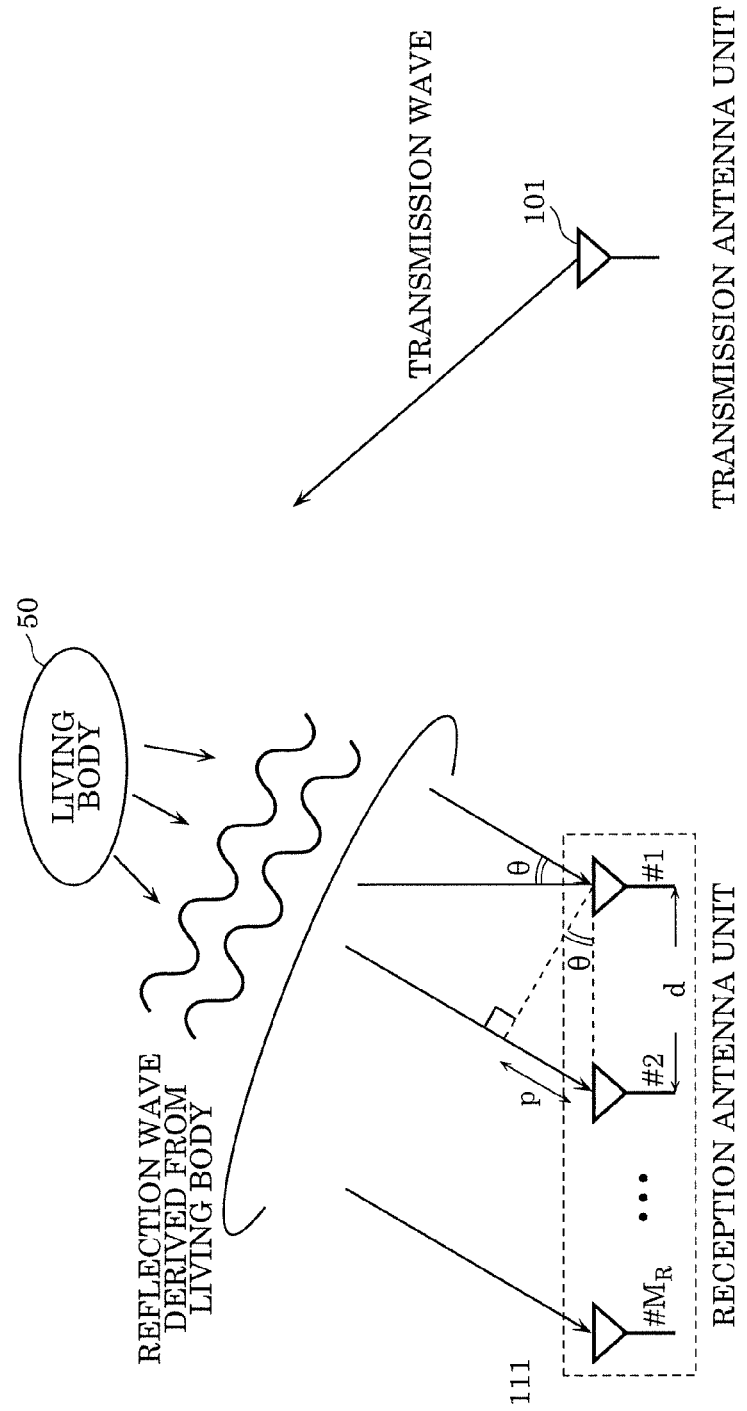
FIG. 2 is a conceptual diagram schematically illustrating the transmission of a transmission wave in the estimation device illustrated in FIG. 1.

FIG. 2 is a conceptual diagram schematically illustrating the transmission of a transmission wave in estimation device 1 illustrated in FIG. 1. As illustrated in FIG. 2, a portion of the transmission wave transmitted from the transmission antenna element of transmission antenna unit 101 is reflected by living body 50 and reaches a reception array antenna of reception antenna unit 111. Here, reception antenna unit 111 is a reception array antenna including $M_R$ reception antenna elements disposed in a linear array and space apart from each other by distance d. The direction of living body 50 relative to a forward direction of reception antenna unit 111 is denoted as θ. It is assumed that the distance between living body 50 and reception antenna unit 111 is sufficiently long and a reflection wave which is derived from a living body and arrives at reception antenna unit 111 can be considered as a plane wave.

Complex transfer function calculator 121 is capable of calculating complex transfer function vectors representing propagation characteristics between the transmission antenna element and each of the $M_R$ reception antenna elements, based on complex reception signal vectors observed using the $M_R$ reception antenna elements.

<Extractor 122>

Extractor 122 extracts, from the plurality of complex transfer functions calculated by complex transfer function calculator 121, living body components that respectively correspond to the N reception antenna elements and are affected by living body 50. More specifically, extractor 122 records, in chronological order, the complex transfer functions calculated by complex transfer function calculator 121, and extracts living body components affected by living body 50 from among variations in the complex transfer functions. Here, the method used to extract living body components affected by living body 50 may be, for example, a method of extracting only components corresponding to a vibration of a living body after a reception signal is converted to the frequency domain using, for example, the Fourier transform, and may be a method of computing a difference between complex transfer functions at two different points in time. By performing one of these methods, complex transfer functions corresponding to a fixed object other than living body 50 are removed, leaving only complex transfer function components corresponding to living body 50. Note that since there are a plurality of reception antenna elements, correspondingly there are also a plurality of complex transfer function components corresponding living body 50. These are collectively defined as a living-body-component channel vector.

<Correlation Matrix Calculator 123>

Correlation matrix calculator 123 calculates a correlation matrix based on living body components corresponding to each of the N reception antenna elements extracted by extractor 122. More specifically, correlation matrix calculator 123 calculates correlation matrix $R_i$ of living-body-component channel vectors configured from living body components, which are the complex transfer function components corresponding to living body 50.

[Computing Unit 13]

Computing unit 13 computes one or more eigenvalues of the correlation matrix calculated by correlation matrix calculator 123. More specifically, computing unit 13 computes eigenvalues of correlation matrix $R_i$ calculated by correlation matrix calculator 123. Computing unit 13 stores the computed eigenvalues of correlation matrix Ri in storage 14.

Computing unit 13 computes the eigenvalues by, for example, eigenvalue decomposition of correlation matrix Ri. Typically, each eigenvalue and each eigenvector indicates a single propagation path, or simply "path", of a radio wave (transmission wave) from transmission antenna unit 101 that reaches reception antenna unit 111. Under ordinary circumstances, there are various paths including those of direct waves and those of reflected waves reflected off fixed objects such as a wall, etc., and each path respectively corresponds to an eigenvalue and an eigenvector. However, in the present embodiment, since correlation matrix $R_i$ is calculated by correlation matrix calculator 123 from living body components respectively corresponding to the N reception antenna elements, the eigenvalues calculated by computing unit 13 indicate paths of waves reflected by living body 50 and paths corresponding to noise.

[Storage 14]

Storage 14 is configured as a hard disk drive (HDD) or memory, etc., and stores data, etc., to be used in processing performed by estimation device 1.

For example, storage 14 stores the calculation results of computing unit 13 and data, etc., to be used in estimation processing performed by credibility estimator 15. Storage 14 also stores estimation results of past estimations performed by direction estimator 16.

[Credibility Estimator 15]

Credibility estimator 15 estimates the credibility of the estimation result of the estimation of the direction of living body 50, using the one or more eigenvalues calculated by computing unit 13 and living body count information indicating a value indicating the number of living bodies 50 in the target space. Here, living body count information is information that is provided in advance, and indicates that L number of living bodies 50 are in the target space, which is the measurement target region.

More specifically, credibility estimator 15 calculates ratio information indicating a ratio of or difference between adjacent eigenvalues when the eigenvalues calculated by computing unit 13 are sorted by magnitude. When the value indicated by the living body count information is L is a natural number greater than or equal to 1), if the ratio information corresponding to the L-th eigenvalue is at least a predetermined value, credibility estimator 15 determines the credibility of the estimation result to be high.

In other words, credibility estimator 15 evaluates the credibility of the estimation result from direction estimator 16, based on an eigenvalue distribution obtained by sorting the eigenvalues calculated by computing unit 13 by magnitude.

FIG. 3 illustrates one example of an eigenvalue distribution according to Embodiment 1.

The eigenvalue distribution is a distribution obtained when the eigenvalues calculated by computing unit 13 are sorted by magnitude. As illustrated in FIG. 3, the eigenvalue distribution may be a table in which the eigenvalues are sorted row by row. In the example illustrated in FIG. 3, in the first row of the eigenvalue distribution table, four eigenvalues are sorted in the following order: 20, 18, 0.15, and 0.12. More specifically, in the first row of the table illustrated in FIG. 3, the greatest eigenvalue of 20 is disposed in the "first eigenvalue" column, the second greatest eigenvalue of 18 is disposed in the "second eigenvalue" column, the third greatest eigenvalue of 0.15 is disposed in the "third eigenvalue" column, and the fourth greatest eigenvalue of 0.12 is disposed in the "fourth eigenvalue" column. Note that the second and third rows in the table illustrated in FIG. 3 are configured in the same manner. Accordingly, repeated description thereof is omitted.

FIG. 4 illustrates one example of the ratio information calculated based on the eigenvalue distribution according to Embodiment 1. The credibility of the estimation result determined based on the ratio information is also illustrated in FIG. 4.

The ratio information is one example of a feature of the eigenvalue distribution, and is obtained by calculating the ratio of or difference between adjacent eigenvalues in the eigenvalue distribution. As illustrated in FIG. 4, the ratio information may be a table indicating the results of the calculation of the ratio of adjacent eigenvalues in the eigenvalue distribution row by row in FIG. 3. More specifically, in the first row in the table illustrated in FIG. 4, the ratio of the first eigenvalue to the second eigenvalue in the eigenvalue distribution in the first row of the table illustrated in FIG. 3 is 1.11, the ratio of the second eigenvalue to the eigenvalue in the eigenvalue distribution in the first row of the table illustrated in FIG. 3 is 120, and the ratio of the third eigenvalue to the fourth eigenvalue in the eigenvalue distribution in the first row of the table illustrated in FIG. 3 is 1.25.

When the value indicated by the living body count information is L, the credibility of the estimation result is determined based on whether or not the value indicated in the ratio information corresponding to the L-th eigenvalue counting from the greatest eigenvalue is at least a predetermined value. In the example illustrated in FIG. 4, since the value indicated by the living body count information is two (indicating two people), the credibility is determined based on whether or not the ratio information corresponding to the $2^{nd}$ eigenvalue counting from the greatest eigenvalue, that is to say, the ratio of the second eigenvalue to the third eigenvalue, is at least a predetermined value of, for example, 10. In the first row in the table illustrated in FIG. 4, since the ratio of the second eigenvalue to the third eigenvalue is 120, which is greater than the predetermined value, the credibility of the estimation result is determined to be high. Note that the same applies to the second and third rows in the table illustrated in FIG. 4. Accordingly, repeated description thereof is omitted.

Note that the eigenvalue distribution is not limited to being represented as a table; for example, the eigenvalue distribution may be represented as a graph where eigenvalue magnitude is represented on the vertical axis and index numbers indicating place in order counting from the greatest eigenvalue when the eigenvalues are sorted are represented on the horizontal axis. Similarly, the ratio information of the eigenvalue distribution is not limited to being represented as a table; for example, the ratio information of the eigenvalue distribution may be represented as a graph where eigenvalue ratio is represented on the vertical axis and index numbers indicating place in order counting from the greatest eigenvalue when the eigenvalues are sorted are represented on the horizontal axis.

Figure 5:
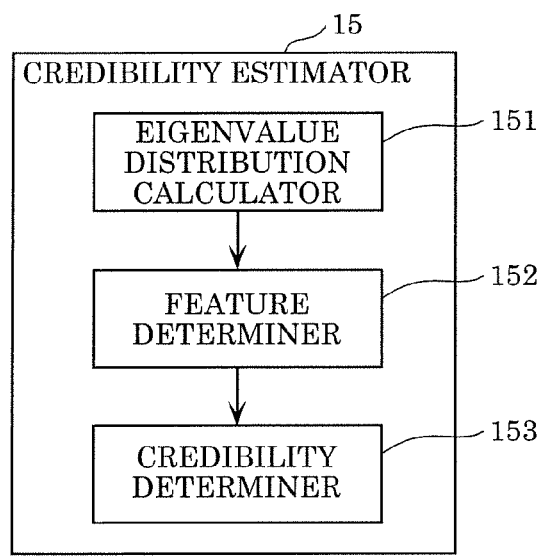
FIG. 5 is a block diagram illustrating one example of a configuration of a credibility estimator according to Embodiment 1.

FIG. 5 is a block diagram illustrating one example of a detailed configuration of credibility estimator 15 according to Embodiment 1.

In this embodiment, as illustrated in FIG. 5, credibility estimator 15 includes eigenvalue distribution calculator 151, feature determiner 152, and credibility determiner 153.

<Eigenvalue Distribution Calculator 151>

Eigenvalue distribution calculator 151 calculates an eigenvalue distribution obtained when the eigenvalues calculated by computing unit 13 are sorted by magnitude. For example, eigenvalue distribution calculator 151 may calculate an eigenvalue distribution like that illustrated in FIG. 6.

Figure 6:
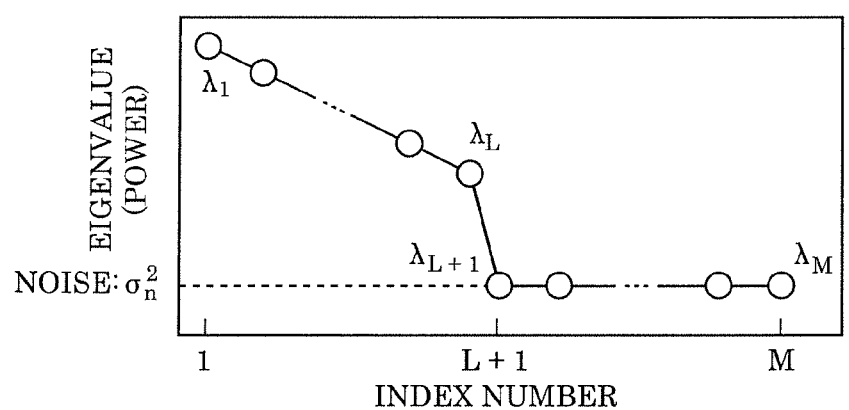
FIG. 6 illustrates one example of another eigenvalue distribution according to Embodiment 1.

FIG. 6 illustrates one example of another eigenvalue distribution according to Embodiment 1. The eigenvalue distribution illustrated in FIG. 6 is calculated by eigenvalue distribution calculator 151 illustrated in FIG. 5. In FIG. 6, eigenvalue magnitude is represented on the vertical axis, and eigenvalue index numbers sorted by magnitude are represented on the horizontal axis, counting from the greatest eigenvalue, number one. Note that FIG. 6 illustrates one example of a graph where M eigenvalues are sorted by magnitude, and illustrates values corresponding to thermal noise, etc., by the dashed line.

Note that eigenvalue distribution calculator 151 may calculate ratio information of the eigenvalue distribution (to be described later) as the eigenvalue distribution.

<Feature Determiner 152>

Feature determiner 152 determines a feature of the eigenvalue distribution calculated by eigenvalue distribution calculator 151. More specifically, feature determiner 152 calculates, as the feature of the eigenvalue distribution, ratio information indicating a ratio of or difference between adjacent eigenvalues in the eigenvalue distribution calculated by eigenvalue distribution calculator 151. For example, feature determiner 152 may calculate ratio information of the eigenvalue distribution like that illustrated in FIG. 7, as the feature of the eigenvalue distribution illustrated in FIG. 6.

Figure 7:
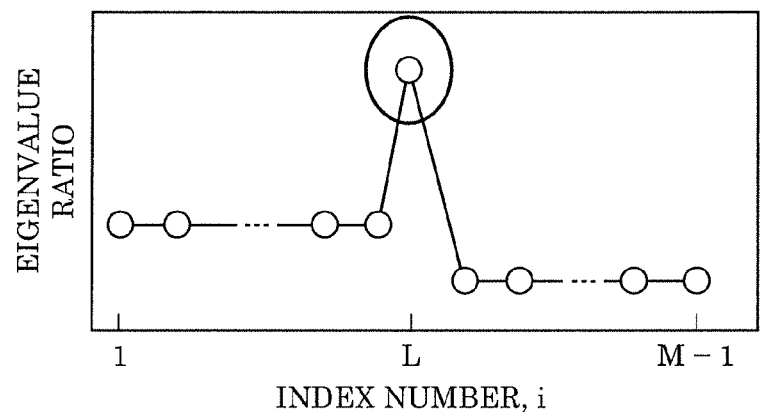
FIG. 7 illustrates another example of ratio information calculated based on the eigenvalue distribution according to Embodiment 1.

FIG. 7 illustrates another example of the ratio information calculated based on the eigenvalue distribution according to Embodiment 1. The graph of the ratio information of the eigenvalue distribution illustrated in FIG. 7 is calculated by feature determiner 152 illustrated in FIG. 5. In FIG. 7, eigenvalue ratio magnitude is represented on the vertical axis, and eigenvalue ratio index numbers are represented on the horizontal axis, counting from the ratio of the greatest eigenvalue and the next greatest eigenvalue as number one, when the eigenvalues are sorted by magnitude. In other words, the ratio information of the eigenvalue distribution illustrated in FIG. 7 indicates a distribution of ratios of adjacent eigenvalues when the eigenvalues calculated by computing unit 13 are sorted by magnitude. Here, the ratio is calculated as $\lambda_i/\lambda_{i+1}$ (i is a natural number), where the numerator eigenvalue $\lambda_i$ corresponds to the eigenvalue ratio index number i (i is a natural number) and the eigenvalue $\lambda_{i+1}$ adjacent to eigenvalue $\lambda_i$ is the denominator.

Note that feature determiner 152 is not limited to determining the ratio information of the eigenvalue distribution as the feature of the eigenvalue distribution calculated by eigenvalue distribution calculator 151; feature determiner 152 may determine an amount of change in the eigenvalues in the eigenvalue distribution as the feature of the eigenvalue distribution.

<Credibility Determiner 153>

Credibility determiner 153 determines the credibility of the estimation result using the feature of the eigenvalue distribution determined by feature determiner 152. More specifically, when the value indicated in the living body count information is L, credibility determiner 153 determines the credibility of the estimation result based on whether or not the value indicated in the ratio information corresponding to the L-th eigenvalue counting from the greatest eigenvalue is at least a predetermined value.

For example, when the value indicated in the living body count information is L, feature determiner 152 calculates, as the ratio information on the L-th eigenvalue, the amount of change between the L-th and the L+1-th eigenvalue in the eigenvalue distribution, i.e., calculates the ratio of the eigenvalues. Feature determiner 152 then determines whether or not the calculated ratio for the L-th eigenvalue is at least the predetermined value to determine whether the credibility of the estimation result is high.

In the example illustrated in FIG. 7, since the value indicated by the living body count information is L, feature determiner 152 determines whether or not the ratio for the L-th eigenvalue circled by the solid line is at least the predetermined value. In the example illustrated in FIG. 7, as one can see from the ratio for the L-th eigenvalue circled by the solid line being at the peak of a spike, feature determiner 152 determines that the ratio for the L-th eigenvalue is at least the predetermined value, and thus determines the credibility of the estimation result to be high.

In this way, since feature determiner 152 can determine whether the L-th and L+1-th eigenvalues abruptly decrease in the eigenvalue distribution using the feature of the eigenvalue distribution determined by feature determiner 152, feature determiner 152 can determine whether or not the credibility of the estimation result from direction estimator 16 is high.

The reason why this is possible is because when L living bodies 50 are in the target space, there are L radio wave propagation paths corresponding to living bodies 50, and there are L eigenvalues that are significantly large eigenvalues compared to noise such as thermal noise.

Stated differently, when there are L living bodies 50 in the target space, when the number of eigenvalues that are significantly large compared to noise is less than L, there are one or more living bodies 50 whose direction has not been estimated. Moreover, when there are L living bodies 50 in the target space, when the number of eigenvalues that are significantly large compared to noise is L+1 or more, more images (living bodies 50) than the number of living bodies 50 that are actually present are seen due to influence from noise, etc. In other words, when there are L living bodies 50 in the target space, since there are supposed to be no more and no less than L significantly large eigenvalues, there should be a difference in the magnitudes of the L-th eigenvalue and the L+1-th eigenvalue. Accordingly, feature determiner 152 can evaluate the credibility of the estimation result from direction estimator 16 by evaluating the magnitude of the difference between the L-th eigenvalue and the L+1-th eigenvalue.

Note that credibility determiner 153 may output the calculated eigenvalue ratio as-is, as the determination result of the credibility of the estimation result from direction estimator 16.

[Direction Estimator 16]

Direction estimator 16 uses a predetermined method to estimate the direction of living body 50 based on the correlation matrix, in accordance with the credibility estimated by credibility estimator 15. More specifically, direction estimator 16 estimates the direction of living body 50 from the viewpoint of reception antenna unit 111, using the correlation matrix calculated by living body information calculator 12, in accordance with the credibility estimated by credibility estimator 15.

Here, direction estimator 16 may estimate the direction of living body 50 using, for example, a MUltiple Signal Classification (MUSIC) method or a beamforming method.

Note that direction estimator 16 may change the output depending on whether the credibility estimated by credibility estimator 15 is high or low. For example, when the credibility estimated by credibility estimator 15 is low, direction estimator 16 may discard the estimation result of the estimation of the direction of living body 50 based on the correlation matrix obtained by computing eigenvalues used in the credibility estimation, and output the previous estimation result. More specifically, when credibility estimator 15 determines the credibility to be low, direction estimator 16 may output a past estimation result of the estimation of the direction of living body 50 whose credibility is determined to be high by credibility estimator 15, from among estimation results generated in a period of time before the determination of the low credibility.

Moreover, instead of discarding the estimation result, direction estimator 16 may output the estimation result along with information, such as a stamp, indicating that the credibility is low.

Moreover, when the credibility determined by credibility estimator 15 is low and the result of the current estimation by direction estimator 16 is removed from the result of the previous estimation by direction estimator 16 by a predetermined threshold or more, direction estimator 16 may discard the current estimation result and output the previous estimation result. Stated differently, when the credibility determined by credibility estimator 15 is low and the current estimation result is temporally removed from the immediately previous estimation result by a predetermined threshold or more, direction estimator 16 may output a past high credibility estimation result from among estimation results generated in a period of time before the determination of the low credibility.

Moreover, direction estimator 16 may set an interval in accordance with the credibility estimated by credibility estimator 15, calculate a temporal average or median of past estimation results from that interval, and output the calculated value as the estimation result. Stated differently, when the credibility is determined to be low by credibility estimator 15, direction estimator 16 may calculate the average or median of past estimation results stored in storage 14 from a time range defined by a first interval set longer than a reference interval in accordance with the degree of the determined credibility, and output the calculated value as the current estimation result.

Note that when direction estimator 16 performs the direction estimation using a method such as a MUSIC method, a beamforming method, or a Capon method, a spectrum of an evaluation function is obtained. In such cases, direction estimator 16 may use the maximum value in each spectrum to evaluate the credibility of the estimation result, and may output the result in accordance with the evaluated credibility.

[Operations Performed by Estimation Device 1]

Next, operations performed by estimation device 1 configured as described above will be described with reference to the drawings.

Figure 8:
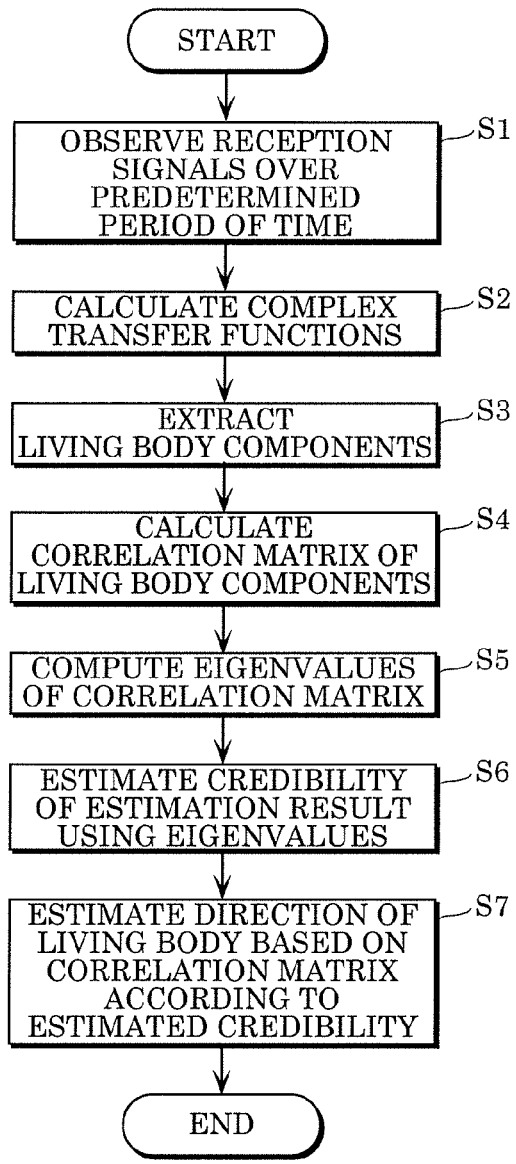
FIG. 8 is a flow chart illustrating one example of operations performed by the estimation device according to Embodiment 1.
Figure 9:
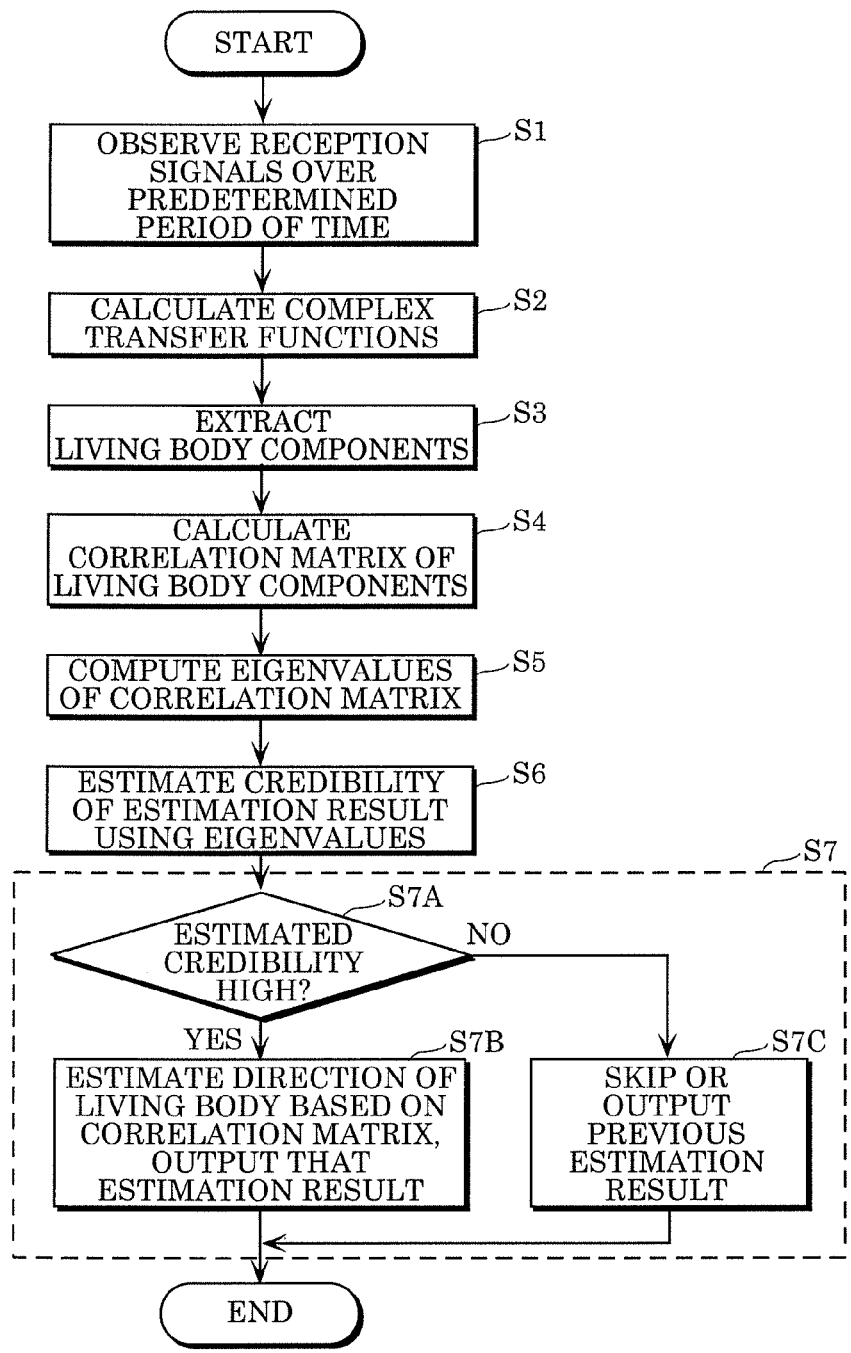
FIG. 9 is a flow chart illustrating another example of operations performed by the estimation device according to Embodiment 1.

FIG. 8 is a flow chart illustrating one example of operations performed by estimation device 1 according to Embodiment 1. FIG. 9 is a flow chart illustrating another example of operations performed by estimation device 1 according to Embodiment 1. Elements that are the same as in FIG. 8 share like reference signs.

First, estimation device 1 observes reception signals for a predetermined period of time (S1). More specifically, estimation device 1 observes, for a predetermined period of time, reception signals including reflected signals, which are signals that have been transmitted from the single transmission antenna element and reflected by living body 50 in the target space.

Next, estimation device 1 calculates complex transfer functions based on the reception signals observed in step S1 (S2). More specifically, estimation device 1 calculates, based on the reception signals received by the respective N reception antenna elements over the predetermined period of time, a plurality of complex transfer functions representing propagation characteristics between the transmission antenna element and each of the N reception antenna elements. As the specifics have already been described above, repeated description will be omitted. The same applies hereinafter.

Next, estimation device 1 extracts living body components, which are components affected by living body 50, from the complex transfer functions calculated in step S2 (S3). More specifically, estimation device 1 extracts, from the plurality of complex transfer functions calculated in step S2, living body components that respectively correspond to the N reception antenna elements and are affected by living body 50.

Next, estimation device 1 calculates a correlation matrix of the living body components extracted in step S3 (S4). More specifically, estimation device 1 calculates a correlation matrix based on the living body components corresponding to each of the N reception antenna elements extracted in step S3.

Next, estimation device 1 computes an eigenvalue of the correlation matrix calculated in step S4 (S5). More specifically, estimation device 1 computes one or more eigenvalues of the correlation matrix calculated in step S4.

Next, estimation device 1 estimates the credibility of the estimation result using the eigenvalue(s) computed in step S5 (S6). More specifically, estimation device 1 estimates the credibility of the estimation result of the estimation of the direction of living body 50, using the one or more eigenvalues calculated in step S4 and living body count information indicating a value indicating the number of living bodies 50 in the target space.

Next, estimation device 1 estimates the direction of living body 50 based on the correlation matrix calculated in step S4, in accordance with the credibility estimated in step S6 (S7). Here, estimation device 1 may use, for example, a MUSIC method to estimate the living body 50 based on the correlation matrix calculated in step S4.

Note that estimation device 1 may change the output depending on whether the credibility estimated in step S6 is high or low. Hereinafter, this will be described in greater detail with reference to FIG. 9.

In S7, first, estimation device 1 may determine whether the credibility estimated in step S6 is high or not (S7A). More specifically, estimation device 1 may determine whether the credibility estimated in step S6 is high or low based on whether or not the credibility is at least a predetermined value.

In step S7A, when the credibility is determined to be high (yes in S7A), estimation device 1 may estimate the direction of living body 50 based on the correlation matrix calculated in step S4, and output that estimation result (S7B).

However, in step S7A, when the credibility is determined to be low (no in S7A), estimation device 1 may skip the current estimation result estimated based on the correlation matrix calculated in step S4, or may discard the current estimation result and output the result of the previous estimation (S7C).

Figure 10:
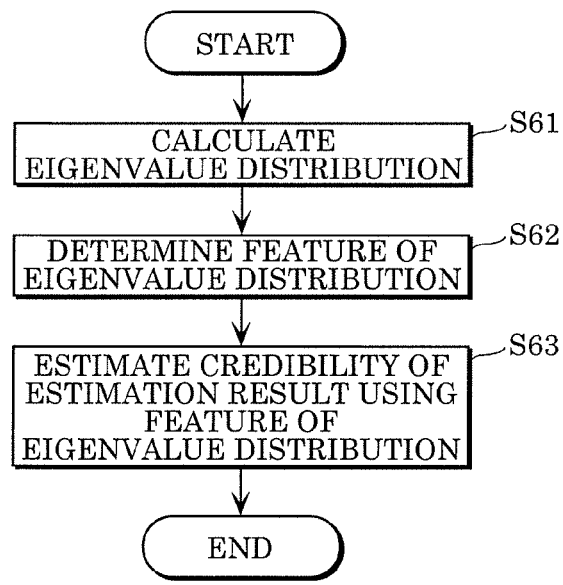
FIG. 10 is a flow chart illustrating one example of the processes of step S6 according to Embodiment 1 in greater detail.

FIG. 10 is a flow chart illustrating one example of the processes of step S6 according to Embodiment 1 in greater detail.

In step S6, first, estimation device 1 calculates an eigenvalue distribution (S61). More specifically, estimation device 1 calculates an eigenvalue distribution obtained when the eigenvalues calculated in step S5 are sorted by magnitude. For example, estimation device 1 may calculate an eigenvalue distribution like the eigenvalue distribution graph illustrated in FIG. 6.

Next, estimation device 1 determines a feature of the eigenvalue distribution calculated in step S61 (S62). More specifically, estimation device 1 calculates, as the feature of the eigenvalue distribution, ratio information indicating a ratio of or difference between adjacent eigenvalues in the eigenvalue distribution calculated in step S61. For example, estimation device 1 may calculate, as the feature of the eigenvalue distribution illustrated in FIG. 6, eigenvalue distribution ratio information like the graph illustrated in FIG. 7.

Next, estimation device 1 estimates the credibility of the estimation result using the feature of the eigenvalue distribution determined in step S62 (S63). More specifically, estimation device 1 estimates the credibility of the estimation result based on, when the value indicated in the living body count information is L, whether or not the value indicated in the ratio information corresponding to the L-th eigenvalue counting from the greatest eigenvalue is at least a predetermined value. In other words, in the eigenvalue distribution calculated in step S61, estimation device 1 determines whether the L-th and L+1-th eigenvalues abruptly decrease by using the value L of the number of living bodies indicated by the living body count information, to estimate the credibility of the estimation result.

(Variation)

In Embodiment 1 described above, although transmitter 10 is described as transmitting, for example, a sine wave of 2.45 GHz, the present disclosure is not limited to this example. Transmitter 10 may transmit, as the transmission waves (radio waves), a multi-carrier signal such as an orthogonal frequency division multiplexing (OFDM) signal, for example. Hereinafter, a variation of transmitter 10 where transmitter 10 is configured to transmit, as the transmission waves, a multi-carrier signal such as an OFDM signal, will be described.

[Configuration of Estimation Device 1 According to Present Variation]

Estimation device 1 according to the present variation differs from estimation device 1 according to Embodiment 1 in regard to the handling of multi-carrier signals. Hereinafter, the following description will focus on the points of difference with Embodiment 1, with reference to FIG. 1.

[Transmitter 10]

Transmitter 10 according to the present variation generates, as described above, a multi-carrier signal such as an OFDM signal, for example, and transmits the generated signal from the single transmission antenna element included in transmission antenna unit 101.

[Receiver 11]

Receiver 11 according to the present variation includes reception antenna unit 111 and reception unit 112, just like in Embodiment 1. Receiver 11 according to the present variation differs from receiver 11 according to Embodiment 1 in regard to the signal received by reception unit 112.

Reception unit 112 observes multi-carrier signals received over a predetermined period of time by reception antenna unit 111 that includes the N reception antenna elements. More specifically, reception unit 112 converts the multi-carrier signals received over a predetermined period of time by each of the $M_R$ reception antenna elements into low-frequency signals that can be processed, and decomposes the multi-carrier signals per sub-carrier. For example, when a multi-carrier signal is configured of s sub-carriers, reception unit 112 decomposes the multi-carrier signal into s low-frequency signals and transmits them to living body information calculator 12.

[Living Body Information Calculator 12]

Living body information calculator 12 calculates s items of living body information based on the s low-frequency signals transmitted by reception unit 112. More specifically, living body information calculator 12 performs the calculation processing of the s items of living body information in parallel (performs s calculations in parallel), to conclusively calculate s correlation matrices.

[Computing Unit 13]

Computing unit 13 computes s groups of eigenvalues based on the s correlation matrices calculated by living body information calculator 12.

[Credibility Estimator 15]

Credibility estimator 15 uses the s groups of eigenvalues computed by computing unit 13 to estimate the credibility of the s groups of estimation results when the direction of living body 50 is estimated by direction estimator 16. Credibility estimator 15 estimates the credibility of each of the s groups of estimation results of the estimation of the direction of living body 50, using the s groups of eigenvalues calculated by computing unit 13 and living body count information indicating a value indicating the number of living bodies 50 in the target space. Here, living body count information is information that is provided in advance, and indicates that L living bodies 50 are in the target space, which is the measurement target region.

More specifically, credibility estimator 15 calculates s groups of ratio information for adjacent eigenvalues when the eigenvalues calculated by computing unit 13 are sorted by magnitude. When the value indicated by the living body count information is L, if, in the s groups of ratio information, the ratio information corresponding to the L-th group of eigenvalues is at least a threshold, credibility estimator 15 determines the credibility of the estimation result to be high.

Note that since the method of estimating the credibility in each of the sub-carriers is the same as described in Embodiment 1, repeated description will be omitted.

In this way, credibility estimator 15 can determine whether the credibility of each of the s groups of estimation results from direction estimator 16 are high or not by using the features of the eigenvalue distributions obtained from the s groups of eigenvalues calculated by computing unit 13.

This is because, just like in Embodiment 1, when the direction, etc., of living body 50 in the target space can be estimated accurately, the number of significantly great eigenvalues that appear is equal to the number of living bodies 50. However, when the direction, etc., of living body 50 in the target space cannot be estimated accurately due to, for example, noise, the number of significantly great eigenvalues that appear is greater than or equal to the number of living bodies 50. In other words, since eigenvalue and measurement errors in the area surrounding a given point of measurement (path) among the points of measurement (paths) in the target space have similar tendencies, whether the direction, etc., of living body 50 in the target space can be accurately estimated or not can be known based on the eigenvalues.

Figure 11:
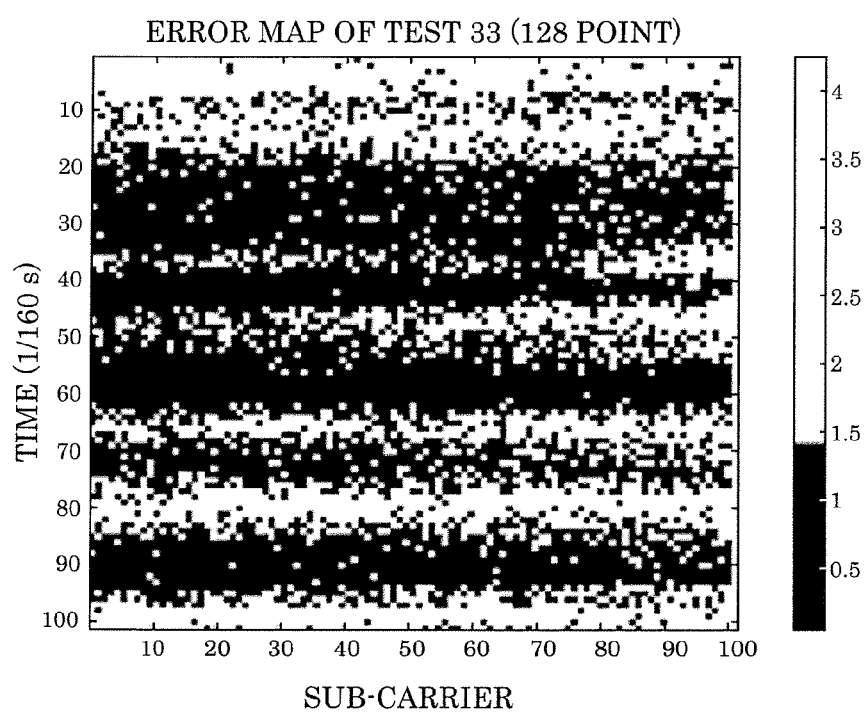
FIG. 11 illustrates one example of a measurement error distribution when sub-carrier signals according to the variation of Embodiment 1 are used.

FIG. 11 illustrates one example of a measurement error distribution when sub-carrier signals according to the variation of Embodiment 1 are used. Sub-carriers are represented on the horizontal axis, and time is represented on the vertical axis.

The measurement error distribution illustrated in FIG. 11 is obtained by estimating the position of living body 50 using the MUSIC method for all sub-carriers at a plurality of points in time, using OFDM signals. The black plotted points in FIG. 11 indicate errors that are less than or equal to a certain threshold.

Figure 12A:
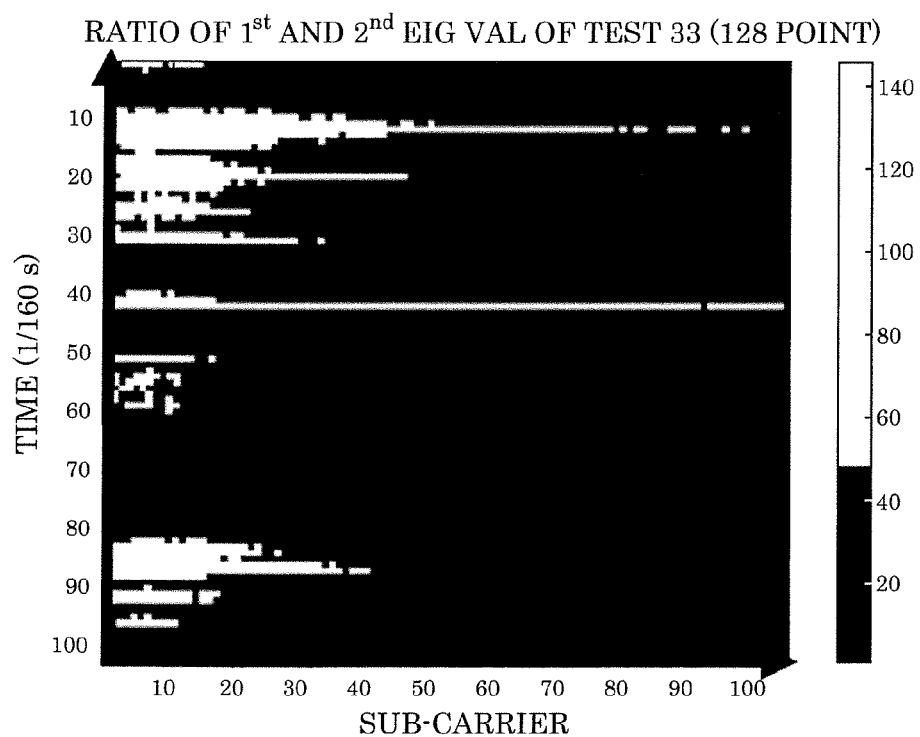
FIG. 12A is a distribution illustrating whether the ratio between the first eigenvalue and the second eigenvalue at the same point in time as the measurement error distribution illustrated in FIG. 11 is greater than or equal to a threshold.
Figure 12B:
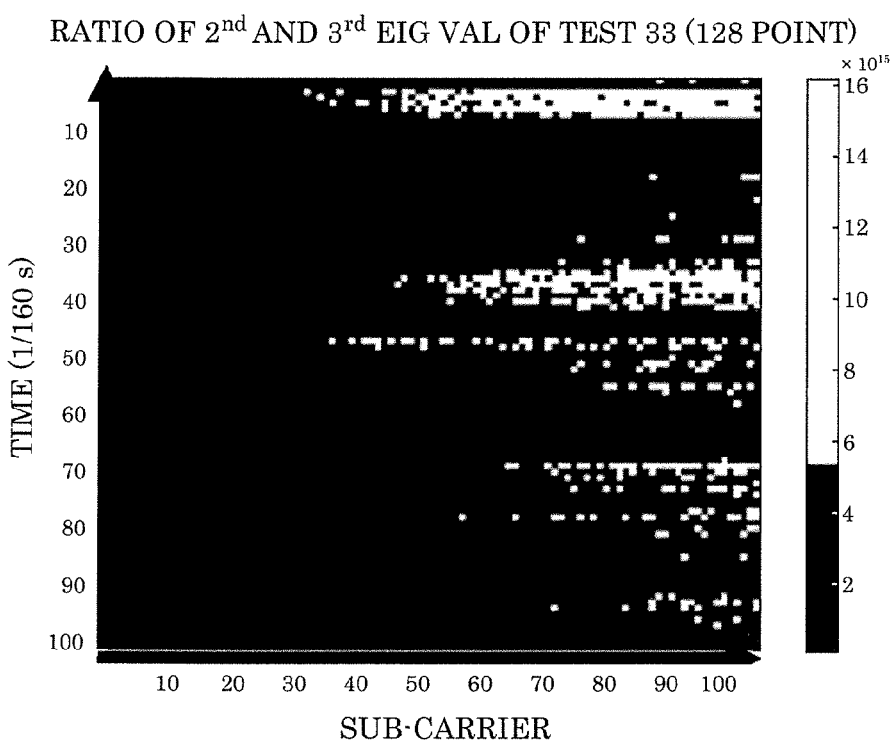
FIG. 12B is a distribution illustrating whether the ratio distribution between the second eigenvalue and the third eigenvalue at the same point in time as the measurement error distribution illustrated in FIG. 11 is greater than or equal to a threshold.

FIG. 12A is a distribution illustrating whether the ratio between the first eigenvalue and the second eigenvalue at the same point in time as the measurement error distribution illustrated in FIG. 11 is greater than or equal to a threshold. FIG. 12B is a distribution illustrating whether the ratio distribution between the second eigenvalue and the third eigenvalue at the same point in time as the measurement error distribution illustrated in FIG. 11 is greater than or equal to a threshold. Note that just like in Embodiment 1, the first eigenvalue is the greatest eigenvalue, the second eigenvalue is the second greatest eigenvalue, and the third eigenvalue is the third greatest eigenvalue. Moreover, "at the same point in time" means that the position along the time axis is the same as in FIG. 11 and the position along the sub-carrier axis is the same as indicated in FIG. 11.

In FIG. 12A, points where the ratio of the first eigenvalue and the second eigenvalue on the same vertical and horizontal axes as in FIG. 11 are less than or equal to a certain threshold are plotted as black points. Comparing FIG. 12A and FIG. 11, in FIG. 12A, in the regions in which ratios of first and second eigenvalues are greater than or equal to the threshold are concentrated and the corresponding regions in FIG. 11 (i.e., the same regions), one can see that there is a tendency for the measurement errors to be less than or equal to the certain threshold.

In FIG. 12B, points where the ratio of the second eigenvalue and the third eigenvalue on the same vertical and horizontal axes as in FIG. 11 are less than or equal to a certain threshold are plotted as black points. Comparing FIG. 12B and FIG. 11, in FIG. 12B, in the regions in which ratios of second and third eigenvalues are greater than or equal to the threshold are concentrated and the corresponding regions in FIG. 11 (i.e., the same regions), one can see that there is a tendency for the measurement errors to be greater than or equal to the certain threshold.

Accordingly, as FIG. 11 through FIG. 12B demonstrate, credibility estimator 15 can determine whether the credibility of the estimation result from direction estimator 16 is high or not by using a distribution of eigenvalue ratios as the feature of the eigenvalue distributions obtained from the s groups of eigenvalues calculated by computing unit 13.

[Direction Estimator 16]

Direction estimator 16 uses a predetermined method to estimate the direction of living body 50 based on the correlation matrix, in accordance with the credibility estimated by credibility estimator 15. More specifically, direction estimator 16 estimates the direction of living body 50 based on the s correlation matrices calculated by living body information calculator 12 and the s credibilities estimated by credibility estimator 15. Here, direction estimator 16 estimates the direction of living body 50 by using, for example, a MUSIC method on the correlation matrices of the sub-carriers.

In this variation, direction estimator 16 produces a conclusive estimation result using a predetermined method to combine the estimation result of the direction of living body 50 and the credibility estimated by credibility estimator 15. Here, for example, direction estimator 16 may output, as the conclusive estimation result, the estimation result having the highest credibility from among the s estimation results, and may output, as the conclusive estimation result, the average or median estimation result of estimation results whose credibility values are greater than or equal to a threshold.

Note that direction estimator 16 may output a past estimation result of the estimation of the direction of living body 50 whose credibility is determined to be high by credibility estimator 15, from among estimation results generated in a period of time before the estimation result whose credibility is determined to be low by credibility estimator 15.

For example, referring to FIG. 12A as an example, direction estimator 16 may output, from among estimation results along the time axis excluding the point in time at which the credibility was determined to be low by credibility estimator 15, an estimation result at a point in time that the credibility was determined to be high.

Moreover, direction estimator 16 may output, from among estimation results of the estimation of the direction of living body 50 in a frequency range excluding a frequency corresponding to a credibility determined to be low by credibility estimator 15, an estimation result at a frequency corresponding to a credibility determined to be high by credibility estimator 15.

For example, referring to FIG. 12A as an example, direction estimator 16 may output, from among estimation results for sub-carriers other than the sub-carrier corresponding to a credibility determined to be low by credibility estimator 15, an estimation result for a sub-carrier corresponding to a credibility determined to be high.

Moreover, when the credibility is determined to be low by credibility estimator 15, direction estimator 16 may perform a combination of any of the above. In other words, direction estimator 16 may output, from among estimation results of the estimation of the direction of living bodies 50 from a past predetermined period of time and in a predetermined frequency range, an estimation result at a past point in time and at frequency corresponding to a credibility determined to be high by credibility estimator 15.

For example, referring to FIG. 12A as an example, assume credibility estimator 15 determines the credibility at one sub-carrier at some point in time (first point in time) to be low. In such cases, direction estimator 16 may output an estimation result corresponding to a sub-carrier other than a sub-carrier corresponding to a credibility determined be high by credibility estimator 15, from a point in time other than the first point in time.

Moreover, when the credibility determined by credibility estimator 15 is low and the current estimation result is temporally removed from the immediately previous estimation result by a predetermined threshold or more, direction estimator 16 may output a past high credibility estimation result from among estimation results generated in a period of time before the determination of the low credibility.

For example, this will be described with reference to FIG. 12A. Assume that the estimation result from direction estimator 16 at one sub-carrier at the first point in time is the "current estimation result", and the estimation result from direction estimator 16 at the same sub-carrier at a second point in time immediately before the first point in time is the "immediately previous estimation result". Furthermore, assume that the credibility at the one sub-carrier at the first point in time is determined to be low by credibility estimator 15, and the current estimation result is temporally removed from the immediately previous estimation result by a predetermined threshold or more.

In such cases, direction estimator 16 may output, from among estimation results whose credibility is determined to be high by credibility estimator 15 and corresponding to the one sub-carrier from a past period of time before the first point in time, an estimation result corresponding to the one sub-carrier from a past point in time whose credibility is determined to be high.

Moreover, a second interval longer than a reference interval may be set depending on the credibility, and, among past estimation results, an average or median of estimation results in the frequency domain included in the second interval may be calculated and output as the estimation result. Stated differently, when the credibility is determined to be low by credibility estimator 15, direction estimator 16 may calculate the average or median of past estimation results stored in storage 14 from a frequency range defined by a second interval set longer than a reference interval in accordance with the degree of the determined credibility, and output the calculated value as the current estimation result.

Note that when the credibility is determined to be low by credibility estimator 15, direction estimator 16 may calculate the average or median of past estimation results stored in storage 14 from a time range defined by a first interval set longer than a reference interval in accordance with the degree of the determined credibility, and output the calculated value as the current estimation result.

In this way, estimation precision can be increased by extending the length of the interval in which the credibility is low beyond the length of a reference interval and calculating the average or median value for that interval.

[Advantageous Effects, Etc.]

With estimation device 1 and the estimation method according to Embodiment 1 and the variation thereof, it is possible to estimate the direction of living body 50 in the target space and evaluate the credibility of the estimation using radio signals. More specifically, living body components affected by living body 50 are extracted based on the complex transfer functions between the single transmission antenna element and the N reception antenna elements, and a correlation matrix and eigenvalues thereof are calculated based on the extracted living body components. Moreover, by estimating the direction of living body 50 after estimating the credibility of the measurement result via a predetermined method using the calculated eigenvalues, it is possible to both estimate the direction of living body 50 in the target space and know the credibility of the estimation result using radio signals.

Moreover, with estimation device 1 and the estimation method according to Embodiment 1 and the variation thereof, since only those components related to living body 50 are extracted from the reception signals, it is possible to estimate the direction of living body 50 without the need to provide living body 50, which is the detection target, with a special device such as a transmitter.

Moreover, by sequentially performing such a direction estimation process, in addition to knowing the number of living bodies 50, the positions of the living bodies 50 can be tracked as well. This makes it possible to know, in real time, the positions of living bodies 50 in the target space using radio signals.

Moreover, with estimation device 1 and the estimation method according to the variation, in addition to the time domain, a plurality of measurements can be taken simultaneously along the sub-carrier axis, that is to say, in the frequency domain, and credibility can be determined. With this, it is possible to search for and output high-credibility estimation results in the frequency domain, which increases estimation precision.

Embodiment 2

In the example given in Embodiment 1, the transmitter and receiver are configured as a SIMO transmitter and a SIMO receiver, but the present disclosure is not limited to this example. The direction of a living body in the target space may be estimated via a predetermined method, by observing a correlation matrix of reception signals using a multiple input multiple output (MIMO) transmitter and a MIMO receiver, and using eigenvalues of the correlation matrix. This will be described hereinafter as Embodiment 2.

The description of Embodiment 2 will focus on the points of difference with Embodiment 1.

[Configuration of Estimation Device 1A]

Figure 13:
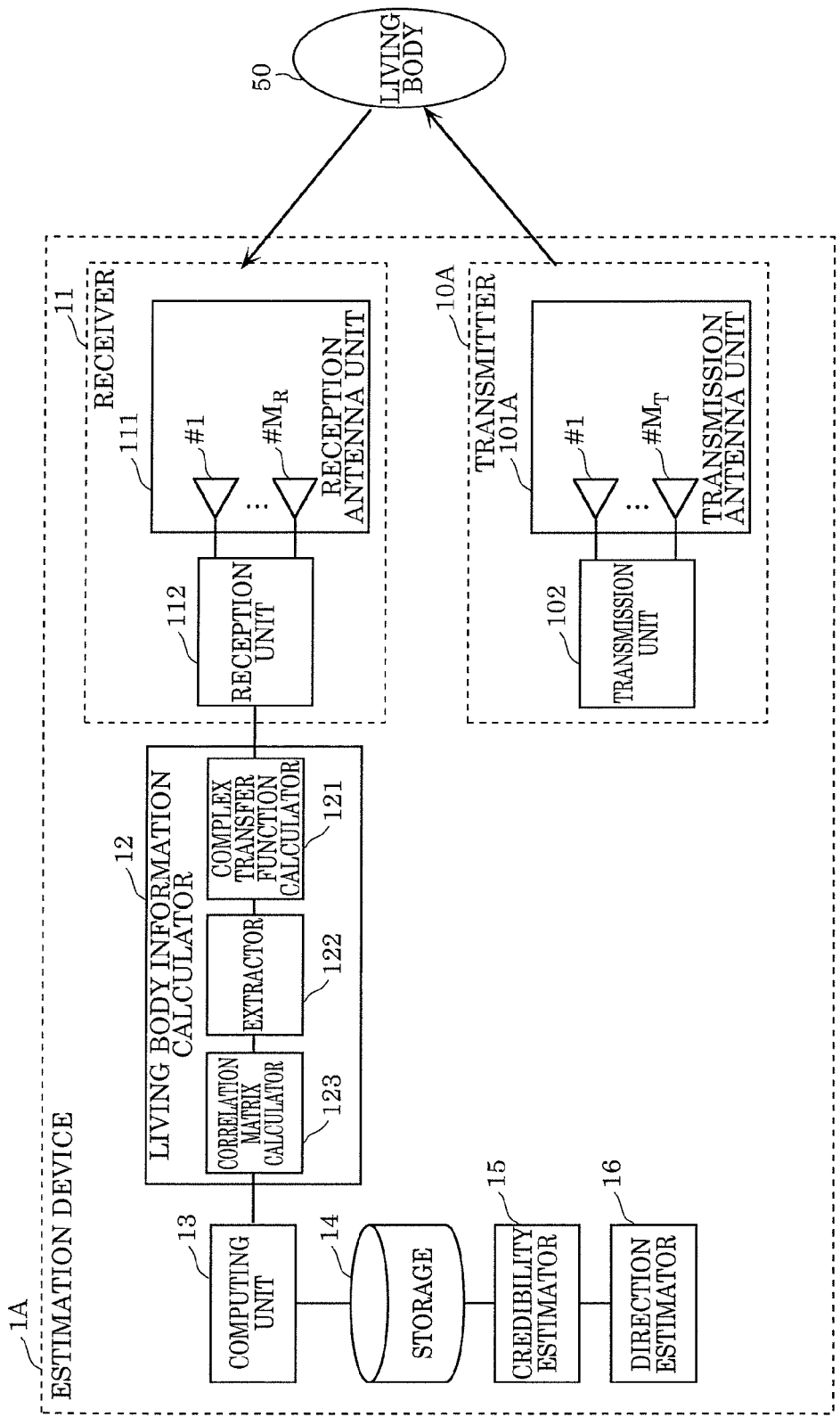
FIG. 13 is a block diagram illustrating one example of a configuration of an estimation device according to Embodiment 2.

FIG. 13 is a block diagram illustrating one example of a configuration of estimation device 1A according to Embodiment 2. Estimation device 1A illustrated in FIG. 13 differs from estimation device 1 according to Embodiment 1 in regard to the configuration of transmitter 10A. With this configuration, it is possible to both estimate the position of living body 50 in the target space and evaluate the credibility of the estimation result of the position.

[Transmitter 10A]

Transmitter 10A includes transmission antenna unit 101A and transmission unit 102.

Transmission antenna unit 101A includes a plurality of transmission antenna elements. In this embodiment, transmission antenna unit 101A includes $M_T$ ($M_T$ is an integer greater than or equal to 2) antenna elements, labeled #1 through #$M_T$, as illustrated in FIG. 13, for example.

Transmission unit 102 transmits transmission signals, which are the generated signals, from the $M_T$ transmission antenna elements included in transmission antenna unit 101A.

[Complex Transfer Function Calculator 121]

Although complex transfer function calculator 121 according to Embodiment 2 has the same configuration as in Embodiment 1, since transmission antenna unit 101A includes a plurality of transmission antenna elements, some of the processing performed by complex transfer function calculator 121 differs from Embodiment 1. Specifically, since estimation device 1A according to this embodiment includes $M_T$ transmission antenna elements and $M_R$ reception antenna elements, complex transfer functions H calculated by complex transfer function calculator 121 are a matrix of $M_R$ rows and $M_T$ columns.

Complex transfer function calculator 121 according to this embodiment first converts the complex transfer functions of $M_R$ rows and $M_T$ columns into vectors of $M_R \times M_T$ rows and one column, using Equation 1. With this, complex transfer function calculator 121 according to the present embodiment can perform the following processes, i.e., calculate the complex transfer functions using the same method as in Embodiment 1.

[Math. 1]

$$vec[H] = [H_{11} \ldots H_{M_R1} H_{12} \ldots H_{M_R2} \ldots H_{1M_T} \ldots H_{M_R M_T}]^T \quad \text{Equation 1}$$

[Direction Estimator 16]

Direction estimator 16 according to Embodiment 2 uses a predetermined method to estimate the position of living body 50 based on the correlation matrix, in accordance with the credibility estimated by credibility estimator 15. More specifically, direction estimator 16 according to Embodiment 2 estimates a plurality of directions of living body 50 from the viewpoint of reception antenna unit 111, using the correlation matrix calculated by living body information calculator 12, in accordance with the credibility estimated by credibility estimator 15, to calculate the position of living body 50.

Note that direction estimator 16 according to Embodiment 2 may change the output depending on whether the credibility estimated by credibility estimator 15 is high or low, just like in Embodiment 1. For example, when the credibility estimated by credibility estimator 15 is low, direction estimator 16 according to Embodiment 2 may discard the estimation result of the estimation of the position of living body 50 based on the correlation matrix obtained by computing eigenvalues used in the credibility estimation, and output the previous estimation result. More specifically, when credibility estimator 15 determines the credibility to be low, direction estimator 16 according to Embodiment 2 may output a past estimation result of the estimation of the position of living body 50 whose credibility is determined to be high by credibility estimator 15, from among estimation results generated in a period of time determination of the low credibility.

Moreover, instead of discarding the estimation result, direction estimator 16 according to Embodiment 2 may output the estimation result along with information, such as a stamp, indicating that the credibility is low.

Moreover, when the credibility determined by credibility estimator 15 is low and the current estimation result is removed from the result of the previous estimation by direction estimator 16 according to Embodiment 2 by a predetermined threshold or more, direction estimator 16 according to Embodiment 2 may discard the current estimation result and output the previous estimation result. Stated differently, when the credibility determined by credibility estimator 15 is low and the current estimation result is temporally removed from the immediately previous estimation result by a predetermined threshold or more, direction estimator 16 according to Embodiment 2 may output a past high credibility estimation result from among estimation results generated in a period of time before the determination of the low credibility.

Moreover, direction estimator 16 according to Embodiment 2 may set an interval in accordance with the credibility estimated by credibility estimator 15, calculate a temporal average or median of past estimation results from that interval, and output the calculated value as the estimation result. Stated differently, when the credibility is determined to be low by credibility estimator 15, direction estimator 16 may calculate the average or median of past estimation results stored in storage 14 from a time range defined by a first interval set longer than a reference interval in accordance with the degree of the determined credibility, and output the calculated value as the current estimation result.

Note that when direction estimator 16 according to Embodiment 2 performs the position estimation using a method such as a MUSIC method, a beamforming method, or a Capon method, a spectrum of an evaluation function is obtained. In such cases, direction estimator 16 may use the maximum value in each spectrum to evaluate the credibility of the estimation result, and may output the result in accordance with the evaluated credibility.

Moreover, just like in the variation of Embodiment 1, transmitter 10A may use a multi-carrier signal such as an OFDM signal, for example, as the transmission wave (radio wave). Since configurations and advantageous effects in such cases are the same as in the variation of Embodiment 1, except for the fact that the position of the living body is estimated as the estimation result rather than the direction of the living body, repeated description will be omitted.

[Advantageous Effects, Etc.]

With estimation device 1A and the estimation method according to Embodiment 2, it is possible to estimate the position of living body 50 in the target space using radio signals. More specifically, living body components affected by living body 50 are extracted based on the complex transfer functions between the plurality of transmission antenna element and each of the N reception antenna elements, and a correlation matrix and eigenvalues thereof are calculated based on the extracted living body components.

Then, using the calculated eigenvalues, the position of living body 50 is estimated and the credibility of the estimation result is evaluated via a predetermined method. In this way, it is possible to estimate the position of living body 50 in the target space using radio signals.

Moreover, with estimation device 1A and the estimation method according to Embodiment 2, just like with estimation device 1, etc., according to Embodiment 1, since only those components related to living body 11 are extracted from the reception signals, it is possible to estimate the position of living body 50 and the credibility of the estimation result without the need to provide living body 50, which is the detection target, with a special device such as a transmitter.

Moreover, in Embodiment 2, since transmitter 10A includes two or more transmission antenna elements, the position of living body 50 can be estimated in addition to the direction of living body 50.

Additionally, by repeatedly performing this position estimation over a predetermined period of time, the position(s) of one or more living bodies can be tracked over the predetermined period of time.

Embodiment 3

In Embodiments 1 and 2, the credibility of the estimation result of the direction or position of a living body is estimated using eigenvalues of observed reception signals, but the present disclosure is not limited to this example. The credibility of the estimation result of the direction or position of a living body may be estimated using an evaluation function spectrum obtained via a direction-of-arrival estimation method, representative examples of which include MUSIC and Capon. This will be described hereinafter as Embodiment 3. The description of Embodiment 3 will focus on the points of difference with Embodiment 1.

[Configuration of Estimation Device 1B]

Figure 14:
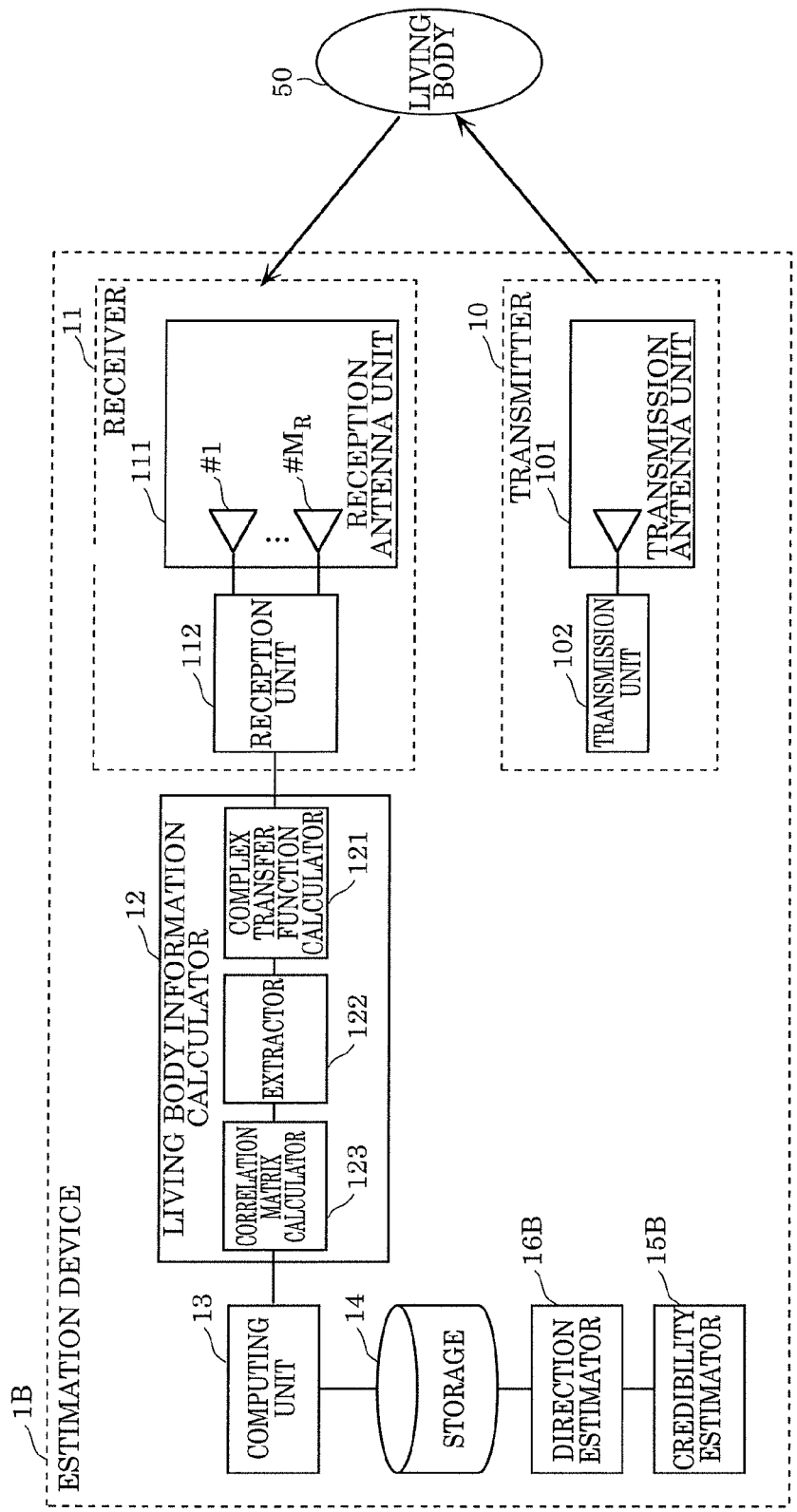
FIG. 14 is a block diagram illustrating one example of a configuration of an estimation device according to Embodiment 3.

FIG. 14 is a block diagram illustrating one example of a configuration of estimation device 1B according to Embodiment 3. Estimation device 1B illustrated in FIG. 14 differs from estimation device 1 according to Embodiment 1 in regard to the configurations of direction estimator 16B and credibility estimator 15B.

[Direction Estimator 16B]

Direction estimator 16B computes an evaluation function using the correlation matrix calculated by correlation matrix calculator 123, and estimates the direction or position of living body 50 using the computed evaluation function. Here, the evaluation function computed in direction estimator 16B may be a MUSIC spectrum, may be a spectrum obtained via a Capon method, and may be a spectrum obtained via a beamforming method.

In this embodiment, direction estimator 16B uses eigenvalues and eigenvectors computed by computing unit 13 and stored in storage 14 to perform direction estimation using a direction-of-arrival estimation method such as MUSIC, Capon, or beamforming, like in Embodiment 1. Moreover, direction estimator 16B transmits, to credibility estimator 15B, a spectrum of the evaluation function used in the direction-of-arrival estimation method.

Since the direction or position of living body 50 can be estimated in the same manner with any of the MUSIC method, the Capon method, or the beamforming method, the following will present an example in which the MUSIC method is used.

Direction estimator 16B calculates a spectrum relative to angle $\theta$ of evaluation function $P_{music}(\theta)$ expressed in Equation 2, based on eigenvalue $\Lambda$ and eigenvector [Math. 2] $U=[u_1, \ldots, u_L, u_{L+1}, \ldots, u_{M_R}]$ calculated by computing unit 13, and total number L of living bodies in the target space (sensing range) of estimation device 1B. This spectrum is herein referred to as a MUSIC spectrum.

Equation 2

$$P_{music}(\theta) = \frac{1}{|a^H(\theta)[u_{L+1}, \ldots, u_{M_R}]a(\theta)|^2} \quad [\text{Math. 3}]$$

Direction estimator 16B searches for the top L local maximum values in the MUSIC spectrum expressed in Equation 2, and estimates the corresponding $\theta$ as the direction of a living body. Moreover, direction estimator 16B outputs values of $P_{music}(\theta)$ corresponding to the top L local maximum values.

[Credibility Estimator 15B]

Credibility estimator 15B estimates the credibility of an estimation result of estimating the position or direction of living body 50, using the evaluation function computed in direction estimator 16B. When the estimated credibility is less than a threshold, credibility estimator 15B determines the credibility of the estimation result to be low, and when the estimated credibility is greater than or equal to the threshold, credibility estimator 15B determines the credibility of the estimation result to be high.

In this embodiment, credibility estimator 15B estimates the credibility of the estimation result from direction estimator 16B based on the local maximum values of evaluation function $P_{music}(\theta)$ calculated by direction estimator 16B. Here, credibility estimator 15B may use the local maximum values of evaluation function $P_{music}(\theta)$ as-is, and, alternatively, may compute ratios of the local maximum values and the local minimum values of evaluation function $P_{music}(\theta)$, and use the computed ratios. Hereinafter, an example will be given in which ratios of the local maximum values and the local minimum values are used.

Credibility estimator 15B determines whether each of the L local maximum values of evaluation function $P_{music}(\theta)$ is greater than or equal to a threshold. When credibility estimator 15B determines that one or more local maximum values among the L local maximum values is greater than or equal to the threshold, credibility estimator 15B estimates that the probability that $\theta$ corresponding to the one or more local maximum values is the correct direction of living body 50 is high. In other words, credibility estimator 15B determines that the credibility of the estimation result for $\theta$ corresponding to the one or more local maximum values is high. Here, the threshold may be a fixed value such as, for example, 2 dB. Alternatively, the threshold may be a value defined based on the value of L. For example, the threshold may be 2 db when L is 2 and 3 db when L is 1.

Figure 15:
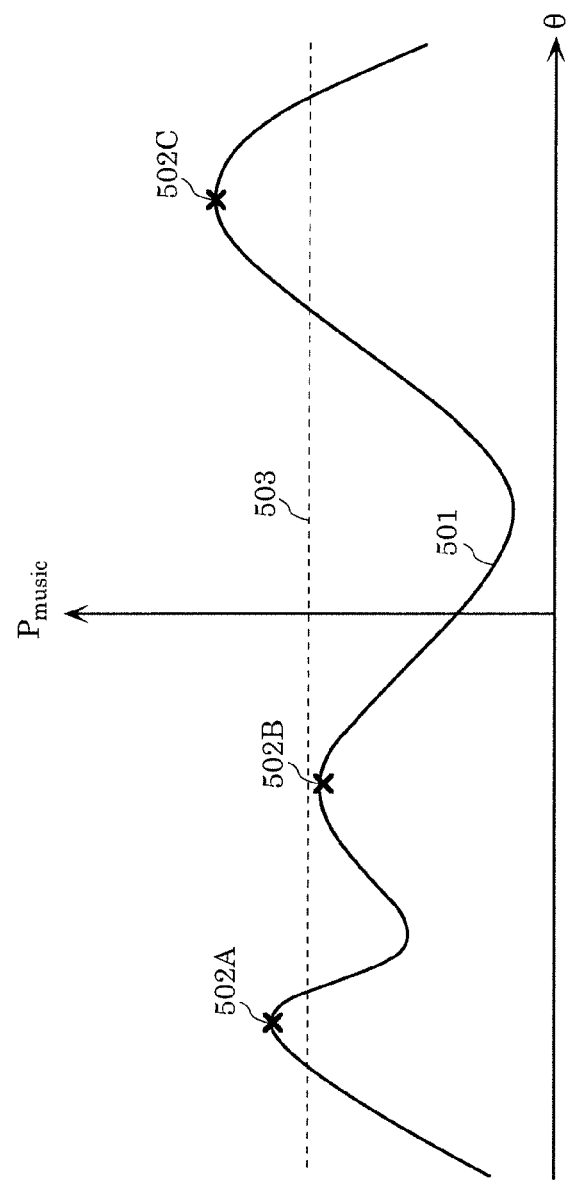
FIG. 15 illustrates one example of a graph of an evaluation function according to Embodiment 3.

FIG. 15 illustrates one example of a graph of an evaluation function according to Embodiment 3. FIG. 15 illustrates a graph of MUSIC spectrum 501 when L is 3 as the evaluation function. As illustrated in FIG. 15, MUSIC spectrum 501 includes three local maximum values 502A, 502B, and 502C.

Using the graph of the evaluation function illustrated in FIG. 15, upon estimating the credibility of the estimation result by direction estimator 16B, credibility estimator 15B determines whether the three local maximum values 502A, 502B, and 502C are greater than or equal to threshold 503. In the example illustrated in FIG. 15, credibility estimator 15B determines that local maximum value 502A and local maximum value 502C are greater than or equal to the threshold, and thus estimates the credibility of the estimation results corresponding to local maximum value 502A and local maximum value 502C to be high. On the other hand, credibility estimator 15B determines that local maximum value 502B is less than the threshold, and thus estimates the credibility of the estimation result corresponding to local maximum value 502B to be low.

Note that just like in the variation of Embodiment 1, transmitter 10 may use a multi-carrier signal such as an OFDM signal, for example, as the transmission wave (radio wave). Since configurations and advantageous effects in such cases are the same as in Embodiment 1 and the variation thereof, repeated description will be omitted.

Moreover, regarding operations performed by estimation device 1B configured as described above, excluding the point that the position of living body 50 in addition to the direction of the living body can be estimated as the estimation result and the point that the credibility of the estimation result is evaluated with an evaluation function used when estimating position, the operations are the same as described in Embodiment 1, and thus repeated description thereof is omitted.

[Advantageous Effects, Etc.]

With estimation device 1B and the estimation method according to Embodiment 3, it is possible to estimate the position of living body 50 in the target space using radio signals. More specifically, living body components affected by living body 50 are extracted based on the complex transfer functions between the single transmission antenna element and each of the N reception antenna elements, and a correlation matrix and eigenvalues thereof are calculated based on the extracted living body components. Moreover, by estimating the direction of living body 50 after estimating the credibility of the measurement result via a predetermined method using the calculated eigenvalues, it is possible to both estimate the position of living body 50 in the target space and know the credibility of the estimation result using radio signals.

Moreover, with estimation device 1B and the estimation method according to Embodiment 3, since only those components related to living body 50 are extracted from the reception signals, it is possible to estimate the position of living body 50 without the need to provide living body 50, which is the detection target, with a special device such as a transmitter.

Moreover, with estimation device 1B and the estimation method according to Embodiment 3, just like with estimation device 1, etc., according to Embodiment 1, since only those components related to living body 11 are extracted from the reception signals, it is possible to estimate the position of living body 50 and the credibility of the estimation result without the need to provide living body 50, which is the detection target, with a special device such as a transmitter.

Moreover, by sequentially performing such a position estimation process, in addition to knowing the number of living bodies 50, the positions of the living bodies 50 can be tracked as well. This makes it possible to know, in real time, the positions of living bodies 50 in the target space using radio signals.

Moreover, with estimation device 1B and the estimation method according to Embodiment 3, in addition to the time domain, a plurality of measurements can be taken simultaneously along the sub-carrier axis, that is to say, in the frequency domain, and credibility can be determined. With this, it is possible to search for and output high-credibility estimation results in the frequency domain, which increases estimation precision.

Hereinbefore, an estimation device and an estimation method according to one aspect of the present disclosure have been described based on exemplary embodiments, but the present disclosure is not limited to the above exemplary embodiments. Those skilled in the art will readily appreciate that many modifications are possible in the exemplary embodiments without materially departing from the novel teachings and advantages of the present disclosure. Accordingly, all such modifications are intended to be included within the scope of the present disclosure.

Moreover, the present disclosure is not limited to being realized as an estimation device that includes such characterizing elements; the present disclosure may be realized as, for example, an estimation method in which the characterizing elements included in the estimation device are implemented as steps. Moreover, each of the characterizing steps included in such a method may be realized as a computer program executed by a computer. It goes without saying that such a computer program can be distributed via a non-transitory computer-readable recordable medium such as a CD-ROM, or over a communication network such as the internet.

INDUSTRIAL APPLICABILITY

The present disclosure can be used in, for example, an estimation method and an estimation device that estimate the direction or position of a living body using radio signals, and in particular, can be used in an estimation method and an estimation device used in, for example, a monitoring device that detects the intrusion of a living body.

What is claimed is:

1. An estimation method of an estimation device of estimating a position or a direction of a living body in a target space, the estimation method using (i) a transmitter including at least one transmission antenna element and (ii) a receiver including N reception antenna elements, where N is a natural number greater than or equal to two, the estimation method comprising:
    calculating, based on reception signals respectively received by the N reception antenna elements over a predetermined period of time, a plurality of complex transfer functions representing propagation characteristics between the at least one transmission antenna element and each of the N reception antenna elements;
    extracting, from the plurality of complex transfer functions calculated in the calculating of the plurality of complex transfer functions, living body components respectively corresponding to the N reception antenna elements and affected by the living body;
    calculating a correlation matrix based on the living body components respectively corresponding to the N reception antenna elements extracted in the extracting;
    computing one or more eigenvalues of the correlation matrix calculated in the calculating of the correlation matrix;
    estimating whether a credibility of an estimation result of estimating the position or the direction of the living body is high or low, using living body count information and the one or more eigenvalues computed in the computing, the living body count information indicating a value indicating a total number of living bodies in the target space; and estimating the position or the direction of the living body via a predetermined method, based on the correlation matrix corresponding to the one or more eigenvalues computed when the credibility was estimated to be high.

2. The estimation method according to claim 1, wherein in the estimating of the credibility, (1) ratio information indicating a ratio of or difference between adjacent eigenvalues when the one or more eigenvalues computed in the computing are sorted in descending order of magnitude is calculated; and (2) when the value indicated by the living body count information is L, if the ratio information corresponding to an L-th eigenvalue of the one or more eigenvalues sorted is at least a predetermined value, the credibility of the estimation result is determined to be high, where L is a natural number greater than or equal to one.

3. The estimation method according to claim 1, wherein in the estimating of the position or the direction of the living body, when the credibility is determined to be low in the estimating of the credibility, an estimation result of the estimating of the position or the direction of the living body whose credibility is determined to be high in the estimating of the credibility is output from among estimation results generated in a period of time before the credibility is determined to be low.

4. The estimation method according to claim 1, wherein in the estimating of the position or the direction of the living body, when the credibility is determined to be low in the estimating of the credibility, an estimation result of the estimating of the position or the direction of the living body whose credibility is determined to be high in the estimating of the credibility is output from among estimation results corresponding to a frequency range excluding a frequency corresponding to the credibility determined to be low.

5. The estimation method according to claim 1, wherein in the estimating of the position or the direction of the living body, when the credibility is determined to be low in the estimating of the credibility, an estimation result of the estimating of the position or the direction of the living body whose credibility is determined to be high in the estimating of the credibility is output from among estimation results generated in a past predetermined period of time and corresponding to a predetermined frequency range.

6. The estimation method according to claim 1, wherein in the estimating of the position or the direction of the living body, when the credibility is determined to be low in the estimating of the credibility, the current estimation result is discarded and, an estimation result whose credibility is determined to be high is output from among the estimation results generated in a period of time before the credibility is determined to be low.

7. The estimation method according to claim 1, further comprising:

storing, in a memory, estimation results of past estimations performed in the estimating of the position or the direction of the living body, wherein in the estimating of the position or the direction of the living body, when the credibility is determined to be low in the estimating of the credibility, an average or a median of the estimation results of the past estimations that are stored in the memory is output as a current estimation result, the past estimations being selected for the averaging or taking of the median in accordance with the degree of the credibility thereof.

8. The estimation method according to claim 1, further comprising:

storing, in a memory, estimation results of past estimations performed in the estimating of the position or the direction of the living body, wherein in the estimating of the position or the direction of the living body, when the credibility is determined to be low in the estimating of the credibility, an average or a median of the estimation results of the past estimations that are stored in the memory is output as a current estimation result, the past estimations being selected for the averaging or taking of the median in accordance with the degree of the credibility thereof.

9. An estimation method of an estimation device of estimating a direction or a position of a living body in a target space, the estimation method using (i) a transmitter including at least one transmission antenna element and (ii) a receiver including N reception antenna elements, where N is a natural number greater than or equal to two, the estimation method comprising:

calculating, based on reception signals respectively received by the N reception antenna elements over a predetermined period of time, a plurality of complex transfer functions representing propagation characteristics between the at least one transmission antenna element and each of the N reception antenna elements;

extracting, from the plurality of complex transfer functions calculated in the calculating of the plurality of complex transfer functions, living body components respectively corresponding to the N reception antenna elements and affected by the living body;

calculating a correlation matrix based on the living body components respectively corresponding to the N reception antenna elements extracted in the extracting;

estimating the direction or the position of the living body, by computing an evaluation function using the correlation matrix, and using the evaluation function computed; and estimating whether a credibility of an estimation result of the estimating of the direction or the position of the living body is high or low, using the evaluation function computed in the estimating of the direction or the position of the living body; and outputting the direction or the position of the living body estimated using the evaluation function corresponding to when the credibility was estimated to be high.

10. The estimation method according to claim 9, wherein the evaluation function computed in the estimating of the direction or the position of the living body is a MUltiple SIgnal Classification (MUSIC) spectrum.

11. The estimation method according to claim 9, wherein the evaluation function computed in the estimating of the direction or the position of the living body is a spectrum obtained via a Capon method.

12. The estimation method according to claim 9, wherein the evaluation function computed in the estimating of the direction or the position of the living body is a spectrum obtained via a beamforming method.

13. The estimation method according to claim 9, wherein in the estimating of the credibility, when the credibility estimated is less than a threshold, the credibility is determined to be low, and when the credibility estimated is greater than or equal to the threshold, the credibility is determined to be high.

14. An estimation device that estimates a position or a direction of a living body in a target space using (i) a transmitter including at least one transmission antenna element and (ii) a receiver including N reception antenna elements, where N is a natural number greater than or equal to two, the estimation device comprising computer programing modules including:

- a complex transfer function calculator that calculates, based on reception signals respectively received by the N reception antenna elements over a predetermined period of time, a plurality of complex transfer functions representing propagation characteristics between the at least one transmission antenna element and each of the N reception antenna elements;
- an extractor that extracts, from the plurality of complex transfer functions calculated in the complex transfer function calculator, living body components respectively corresponding to the N reception antenna elements and affected by the living body;
- a correlation matrix calculator that calculates a correlation matrix based on the living body components respectively corresponding to the N reception antenna elements extracted in the extractor;
- a computing unit configured to compute one or more eigenvalues of the correlation matrix calculated in the correlation matrix calculator;
- a credibility estimator that estimates whether a credibility of an estimation result of estimating the position or the direction of the living body is high or low, using living body count information and the one or more eigenvalues computed in the computing unit, the living body count information indicating a value indicating a total number of living bodies in the target space; and
- an estimator that estimates the position or the direction of the living body via a predetermined method, based on the correlation matrix corresponding to the one or more eigenvalues computed when the credibility was estimated to be high.

15. A non-transitory computer-readable recording medium for use in a computer, the recording medium having a computer program recorded thereon for causing the computer to execute an estimation method of an estimation device of estimating a position or a direction of a living body in a target space, the estimation method using (i) a transmitter including at least one transmission antenna element and (ii) a receiver including N reception antenna elements, where N is a natural number greater than or equal to two, wherein the estimation method includes:

- calculating, based on reception signals respectively received by the N reception antenna elements over a predetermined period of time, a plurality of complex transfer functions representing propagation characteristics between the at least one transmission antenna element and each of the N reception antenna elements;
- extracting, from the plurality of complex transfer functions calculated in the calculating of the plurality of complex transfer functions, living body components respectively corresponding to the N reception antenna elements and affected by the living body;
- calculating a correlation matrix based on the living body components respectively corresponding to the N reception antenna elements extracted in the extracting;
- computing one or more eigenvalues of the correlation matrix calculated in the calculating of the correlation matrix;
- estimating whether a credibility of an estimation result of estimating the position or the direction of the living body is high or low, using living body count information and the one or more eigenvalues computed in the computing, the living body count information indicating a value indicating a total number of living bodies in the target space; and
- estimating the position or the direction of the living body via a predetermined method, based on the correlation matrix corresponding to the one or more eigenvalues computed when the credibility was estimated to be high.

* * * * *